US012716773B2

(12) United States Patent
Shimada et al.

(10) Patent No.: US 12,716,773 B2
(45) Date of Patent: Aug. 25, 2026

(54) SIGNAL PROCESSING CIRCUIT, AND LIGHT DETECTING DEVICE

(71) Applicant: HAMAMATSU PHOTONICS K.K., Hamamatsu (JP)

(72) Inventors: Riku Shimada, Hamamatsu (JP); Takuya Fujita, Hamamatsu (JP); Takashi Baba, Hamamatsu (JP); Shunsuke Adachi, Hamamatsu (JP); Shinya Iwashina, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 189 days.

(21) Appl. No.: 18/834,338

(22) PCT Filed: Jan. 27, 2023

(86) PCT No.: PCT/JP2023/002700
§ 371 (c)(1),
(2) Date: Jul. 30, 2024

(87) PCT Pub. No.: WO2023/149382
PCT Pub. Date: Aug. 10, 2023

(65) Prior Publication Data

US 2025/0116551 A1 Apr. 10, 2025

(30) Foreign Application Priority Data

Feb. 1, 2022 (JP) ................................. 2022-014282

(51) Int. Cl.
*G01J 1/44* (2006.01)

(52) U.S. Cl.
CPC ......... *G01J 1/44* (2013.01); *G01J 2001/4466* (2013.01)

(58) Field of Classification Search
CPC .............. H04N 25/773; G01J 2001/444; G01J 2001/4466
See application file for complete search history.

(56) References Cited

U.S. PATENT DOCUMENTS

2020/0370955 A1 11/2020 Hennecke et al.
2023/0061653 A1* 3/2023 Zhu ....................... G01S 7/4861

FOREIGN PATENT DOCUMENTS

CN 112945379 A 6/2021
JP H7-306133 A 11/1995
(Continued)

OTHER PUBLICATIONS

International Preliminary Report on Patentability mailed Aug. 15, 2024 for PCT/JP2023/002700.

*Primary Examiner* — Thanh Luu
(74) *Attorney, Agent, or Firm* — Faegre Drinker Biddle & Reath LLP

(57) ABSTRACT

In a signal processing circuit, an input terminal is configured to receive an analog signal output from an avalanche photodiode operating in Geiger mode. A comparison circuit outputs a signal based on a component exceeding a threshold among components a signal input to the comparison circuit. The adjustment circuit includes an AC coupling unit, a level shifter unit, and a reference value adjustment unit. The AC coupling unit establishes AC coupling between the input terminal and the comparison circuit. The level shifter unit adjusts the voltage of the signal input to the comparison circuit to a value lower than a reverse bias voltage applied to the avalanche photodiode. The reference value adjustment unit adjusts the reference value of the signal input to the comparison circuit.

11 Claims, 15 Drawing Sheets

(56) References Cited

FOREIGN PATENT DOCUMENTS

| | | | |
|---|---|---|---|
| JP | 2008-538606 | A | 10/2008 |
| JP | 2017-538281 | A | 12/2017 |
| JP | 2019-197833 | A | 11/2019 |
| JP | 2020-017861 | A | 1/2020 |
| JP | 2021-524794 | A | 9/2021 |
| WO | WO-2006/111883 | A2 | 10/2006 |
| WO | WO-2016/048754 | A1 | 3/2016 |
| WO | WO-2019/221784 | A1 | 11/2019 |

* cited by examiner

SUCCEEDING-STAGE CIRCUIT
1
21
22
23
24
25
BE
11
12
13
14
15
41
42
43
44
51
51a
51b
52
53
54
55
56
57
58
59
61
62
63

Figure 14:
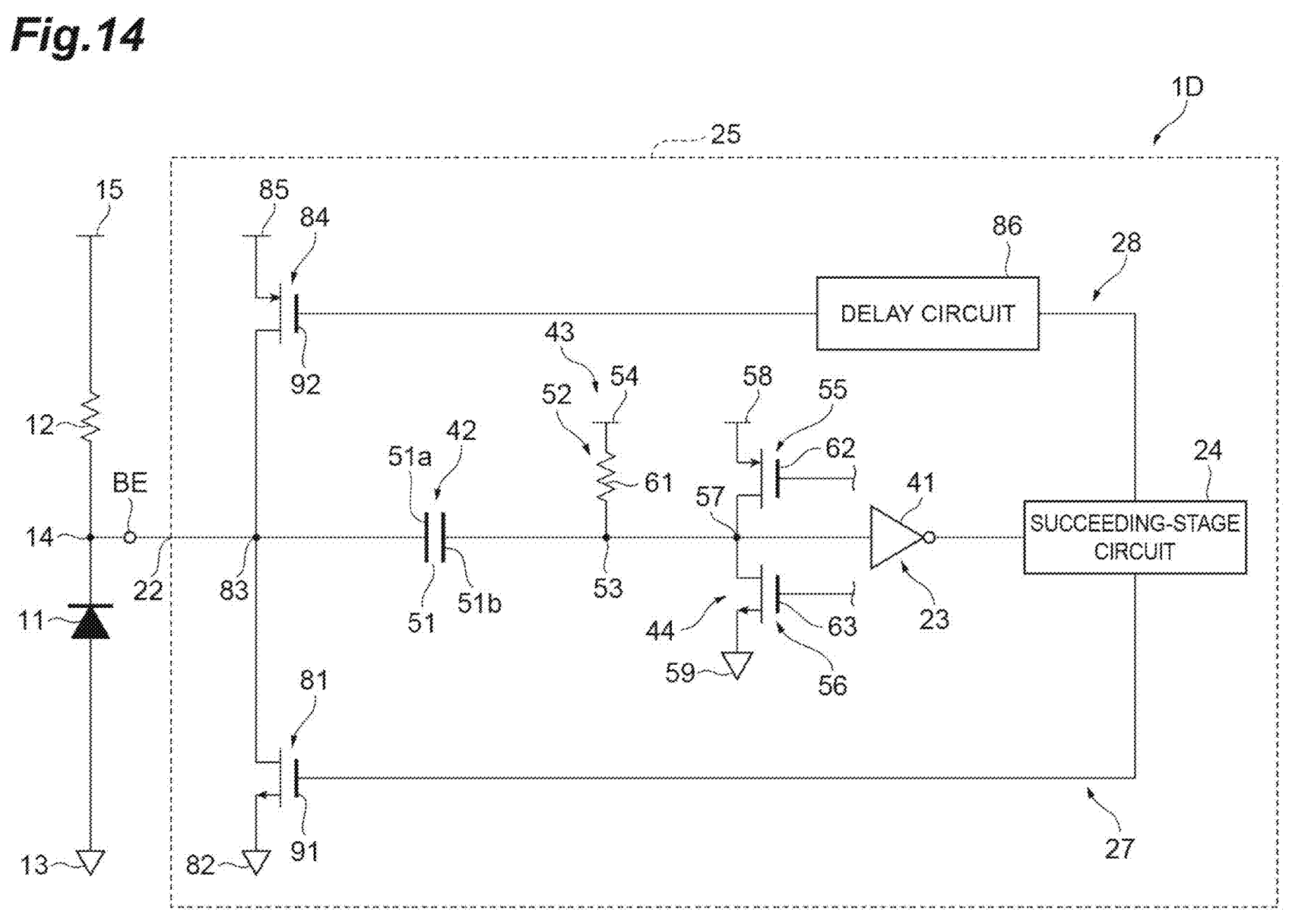

1D
25
24
SUCCEEDING-STAGE CIRCUIT
28
27
86
DELAY CIRCUIT
41
23
55
62
63
56
58
57
44
59
54
61
53
43
52
42
51b
51a
51
84
92
85
81
91
83
82
15
BE
22
12
14
11
13

SIGNAL PROCESSING CIRCUIT, AND LIGHT DETECTING DEVICE

TECHNICAL FIELD

The present invention relates to a signal processing circuit and a light detecting device.

BACKGROUND ART

A light detecting device in which an avalanche photodiode operating in Geiger mode is connected to a signal processing circuit is known (e.g., Patent Literature 1). In Patent Literature 1, the signal processing circuit includes a preceding-stage circuit that receives light through the avalanche photodiode and a succeeding-stage circuit that processes a signal output from the preceding-stage circuit. The preceding-stage circuit includes an AC coupling unit. The AC coupling unit is provided between the avalanche photodiode and the succeeding-stage circuit, thus establishing AC coupling between the avalanche photodiode and the succeeding-stage circuit.

CITATION LIST

Patent Literature

Patent Literature 1: Japanese Unexamined Patent Publication No. 2017-538281

SUMMARY OF INVENTION

Technical Problem

It is conceivable that a comparison circuit used to remove noise components in the signal from the avalanche photodiode may be provided between the AC coupling unit and the succeeding-stage circuit. The comparison circuit is, for example, a circuit element such as a comparator and an inverter, and it outputs a signal on the basis of a component, which exceeds a threshold, among components contained in the signal being input. This results in the removal of noise components. In such a configuration, improving the accuracy of light detection by the avalanche photodiode necessitates further enhancement of the rate at which the signal is transmitted to the succeeding-stage circuit.

Each aspect of the present invention is intended to provide a signal processing circuit and a light detecting device capable of ensuring the precision of noise removal while enhancing the rate at which the signal is transmitted to the succeeding-stage circuit.

Solution to Problem

The present inventors have developed a configuration that provides an AC coupling unit and a level shifter unit further to enhance the signal transmission rate to the succeeding-stage circuit. This configuration reduces the parasitic capacitance between the avalanche photodiode and the comparison circuit in the AC coupling unit, increasing the speed of the variation in the signal output from the avalanche photodiode. In other words, the speed of quenching increases. The level shifter unit adjusts, between the AC coupling unit and the comparison circuit, the voltage of the signal input to the comparison circuit to a value lower than the voltage applied to the avalanche photodiode. Such a configuration that includes the AC coupling unit and the level shifter unit increases the speed of quenching and reduces the voltage of the signal input to the comparison circuit, significantly improving the transmission rate of signals to the succeeding-stage circuit. Furthermore, a relatively high voltage can be ensured on the side of the avalanche photodiode side rather than the AC coupling unit, while a lower voltage can be set on the side of the succeeding-stage circuit side rather than the AC coupling unit.

Ensuring a relatively higher voltage on the side of the avalanche photodiode rather than the AC coupling unit can ensure the photon detection efficiency in the avalanche photodiode. Setting a lower voltage on the side of the succeeding-stage circuit rather than the AC coupling unit makes it possible to use a circuit element operable with a relatively low power supply voltage in the succeeding-stage circuit. Reducing the power supply voltage used to operate the circuit element allows for significantly suppressing the power consumption in the succeeding-stage circuit. The smaller the power supply voltage used to operate the circuit element, the smaller the size of the circuit element and the parasitic capacitance in the circuit element. Reducing the size of the circuit element in the succeeding-stage circuit also makes it possible to reduce the overall size of the signal processing circuit. Reducing the parasitic capacitance in the circuit element further allows suppression of the power consumption in the succeeding-stage circuit and improvement of the input/output response speed in the succeeding-stage circuit. For example, in the case where a metal oxide semiconductor FET (MOSFET: Metal Oxide-Semiconductor Field Effect Transistor) is used as a circuit element, the smaller the power supply voltage of the MOSFET, the smaller the gate length of the MOSFET can be. Reducing the gate length of the MOSFET allows for the decrease of parasitic capacitance in the succeeding-stage circuit.

However, the present inventors faced the challenge of noise removal of a signal in the comparison circuit in the configuration provided with the AC coupling unit and the level shifter unit. The threshold in the comparison circuit may vary. The resistance values in both the level shifter unit and the comparison circuit may also vary. These variations in the threshold and resistance values may occur, for example, during the manufacturing process. If the resistance values in the level shifter unit and the comparison circuit are different, the reference value of the signal input to the comparison circuit will also differ. Thus, both the threshold in the comparison circuit and the reference value of the signal input to the comparison circuit may vary. For this reason, it becomes difficult to remove noise, and maintaining the precision of noise removal is challenging. Taking such an issue into consideration, the present inventors, through further diligent research, discovered a new circuit configuration as an adjustment circuit that adjusts the signal input to the comparison circuit. This adjustment circuit includes an AC coupling unit, a level shifter unit, and a reference value adjustment unit. The reference value adjustment unit adjusts the reference value of the signal input to the comparison circuit. If the reference value of the signal input to the comparison circuit is adjusted according to the variation in the threshold of the comparison circuit, the precision of noise removal can be ensured.

A signal processing circuit according to one aspect of the present invention includes an input terminal, a comparison circuit, an adjustment circuit, and a succeeding-stage circuit. The input terminal is configured to receive an analog signal output from an avalanche photodiode operating in Geiger mode. The comparison circuit removes a noise component related to the signal input to the input terminal by comparing information regarding the signal input to the input terminal with a threshold. The adjustment circuit adjusts the signal input to the comparison circuit. The succeeding-stage circuit processes the signal output from the comparison circuit. The comparison circuit outputs a signal on the basis of a component that exceeds the threshold among the components included in the signal input to the comparison circuit. The adjustment circuit includes an AC coupling unit, a level shifter unit, and a reference value adjustment unit. The AC coupling unit establishes AC coupling between the input terminal and the comparison circuit. The level shifter unit is arranged between the AC coupling unit and the comparison circuit and adjusts the voltage of the signal input to the comparison circuit to a value lower than a reverse bias voltage applied to the avalanche photodiode. The reference value adjustment unit adjusts the reference value of the signal input to the comparison circuit.

In the above-described aspect, the signal processing circuit includes the adjustment circuit that adjusts the signal input to the comparison circuit. The adjustment circuit includes an AC coupling unit, a level shifter unit, and a reference value adjustment unit. This configuration significantly improves the transmission rate of the signal to the succeeding-stage circuit and ensures the precision of noise removal by adjusting the reference value depending on the threshold of the comparison circuit.

In the above-described aspect, the reference value adjustment unit may include a circuit element and a terminal electrically connected to the comparison circuit through the circuit element. The circuit element has a resistance component. The circuit element may include a variable resistance unit configured to change the resistance value of the resistance component of the circuit element. In this case, the reference value of the signal input to the comparison circuit can be easily adjusted by changing the resistance value in the variable resistance unit.

In the above-described aspect, the signal processing circuit may be further provided with a control unit. The control unit may be electrically connected to the variable resistance unit. The control unit may control a resistance value between the terminal and the comparison circuit. In this case, it is possible to easily control the reference value of the signal input to the comparison circuit.

In the above-described aspect, the variable resistance unit may include an FET or an IGBT. The control unit may include a bandgap reference circuit, and the voltage applied to the gate of the FET or IGBT may be controlled on the basis of the bandgap reference circuit. In this case, the bandgap reference circuit can output a voltage independent of temperature, allowing the reference value of the signal input to the comparison circuit to be controlled more accurately.

In the above-described aspect, the variable resistance unit may include a MOSFET. The MOSFET may connect the terminal and the comparison circuit. The source of the MOSFET may be linked to the comparison circuit. In this case, it becomes possible to adjust the reference value of the signal input to the comparison circuit more easily.

In the above-described aspect, the reference value adjustment unit may include first and second circuit elements, a first terminal, and a second terminal. The first and second circuit elements each have a resistance component. The first terminal may be applied with a first potential. The first terminal may be electrically connected to the comparison circuit through the first circuit element. The second terminal is applied with a second potential lower than the first potential. The second terminal may be electrically connected to the comparison circuit through the second circuit element. At least one of the first circuit element and the second circuit element may include a variable resistance unit that corresponds to the circuit element described above and is configured to be able to change the resistance value of the resistance component of at least one of the first and second circuit elements. In this case, changing the resistance value of the variable resistance unit allows for the improvement of the adjustment range of the reference value of the signal input to the comparison circuit.

In the above-described aspect, the first circuit element may include a first N-channel MOSFET as the variable resistance unit. The second circuit element may include a second P-channel MOSFET as the variable resistance unit. The sources of both the first MOSFET and the second MOSFET may be linked to the comparison circuit. In this case, easy and accurate control of the reference value of the signal input to the comparison circuit becomes possible.

In the above-described aspect, the AC coupling unit may include a capacitor. The level shifter unit may include a circuit element having a resistance component and may also include a terminal to which a voltage lower than the reverse bias voltage is applied. The terminal of the level shifter unit may be electrically connected to both the capacitor and the comparison circuit through the circuit element of the level shifter unit. In this case, it becomes possible to easily adjust the voltage of the signal input to the comparison circuit to a value lower than the reverse bias voltage applied to the avalanche photodiode becomes possible.

In the above-described aspect, the comparison circuit may include an inverter. In this case, further improvement of the transmission rate of the signal to the succeeding-stage circuit compared to the case where a comparator with a more complicated structure is used becomes possible.

In the above-described aspect, the signal processing circuit may further include at least one of an active quenching circuit and an active recharge circuit. The active quenching circuit performs active quenching on the avalanche photodiode on the basis of a signal from the succeeding-stage circuit. The active recharge circuit actively recharges the avalanche photodiode on the basis of a signal from the succeeding-stage circuit. In this case, the time required for quenching and recharging is further shortened by the synergistic effect between at least one of both the active quenching circuit and the active recharge circuit and the adjustment circuit. Furthermore, while ensuring the photon detection efficiency of the avalanche photodiode, it is possible to use a circuit element with a relatively low voltage tolerance in the succeeding-stage circuit.

A light detecting device according to another aspect of the present invention includes the above-mentioned signal processing circuit, the avalanche photodiode, and a quenching resistor electrically connected to the avalanche photodiode. The AC coupling unit establishes AC coupling between the avalanche photodiode, the quenching resistor, and the comparison circuit.

In the other aspect mentioned above, while the transmission rate of the signal to the succeeding-stage circuit is significantly improved, the precision of noise removal can also be ensured by adjusting the reference value depending on the threshold of the comparison circuit. As a result, the detection accuracy of the light incident on the avalanche photodiode can be further improved.

Advantageous Effects of Invention

Each aspect of the present invention can provide a signal processing circuit and a light detecting device capable of improving the rate at which signals are transmitted to succeeding-stage circuits while ensuring the precision of noise removal.

BRIEF DESCRIPTION OF DRAWINGS

FIG. 14 is a schematic circuit diagram of a portion of the light detecting device in the modification of the present embodiment.

DESCRIPTION OF EMBODIMENTS

Figure 1:
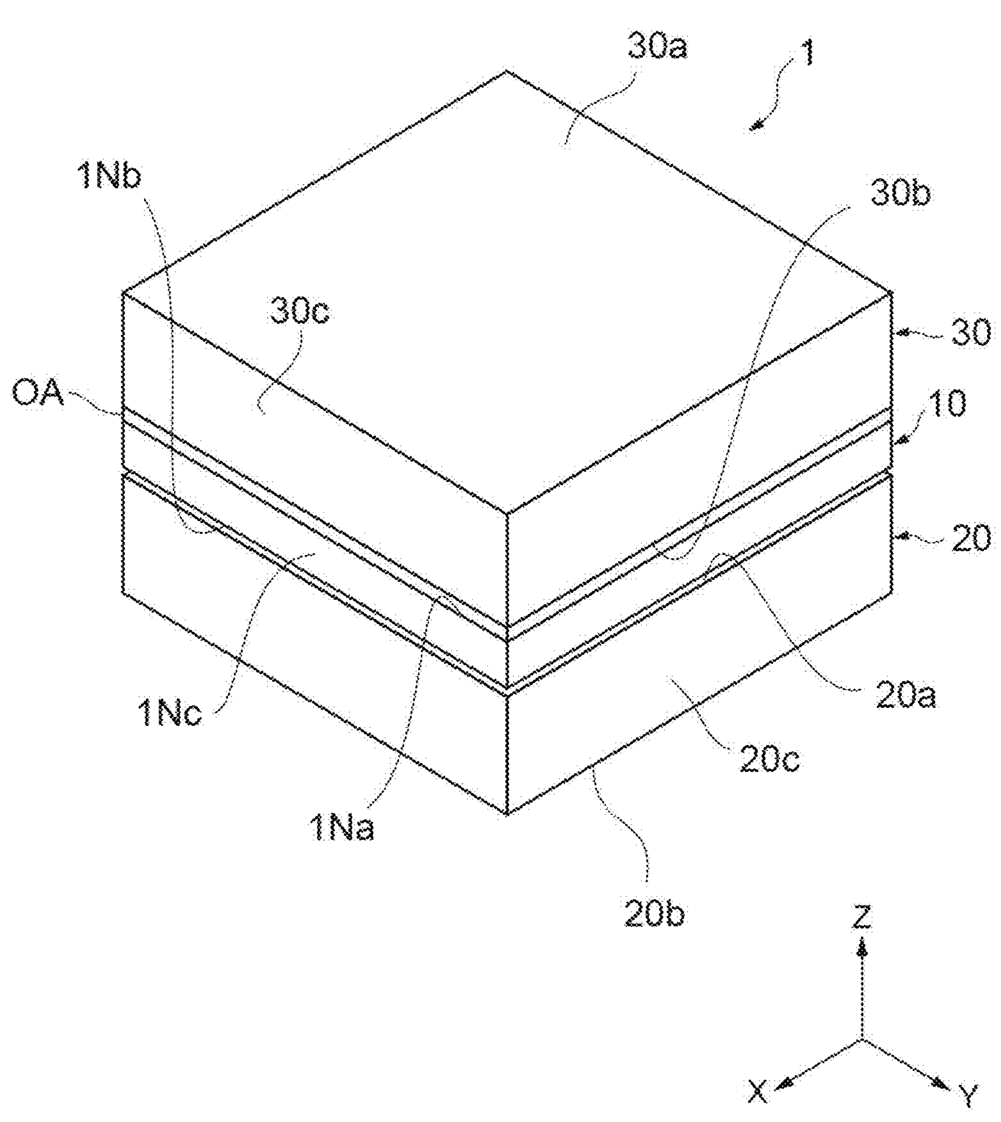
FIG. 1 is a schematic perspective view illustrating an example of a light detecting device according to an embodiment.

Embodiments of the present invention are now described in detail with reference to the accompanying drawings. Moreover, in the description, the same reference numerals will be used for elements having the same components or functions, and redundant descriptions will be omitted.

Figure 2:
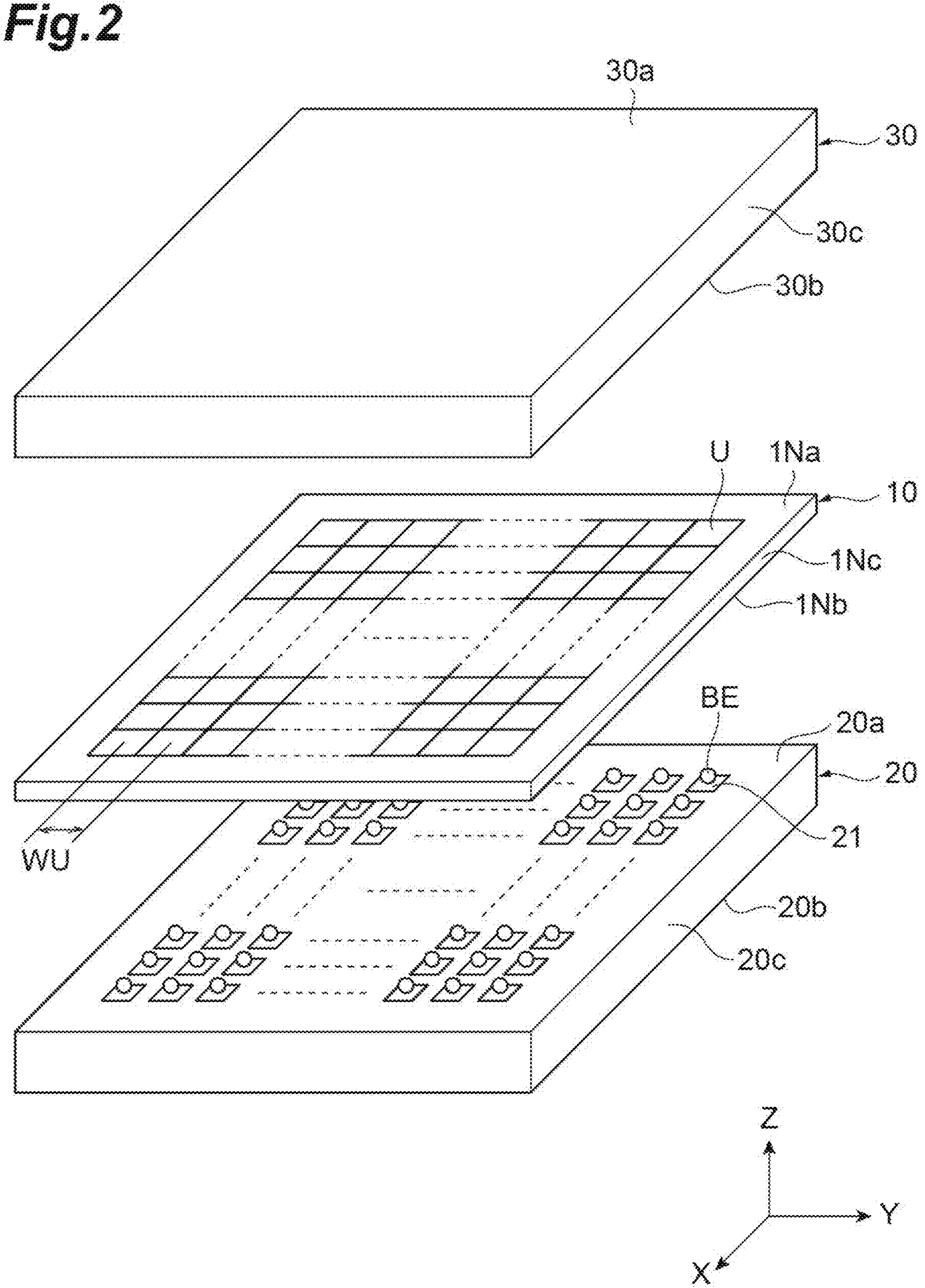
FIG. 2 is an exploded perspective view illustrating an example of the light detecting device.

The configuration of a light detecting device according to the present embodiment is now described with reference to FIGS. 1 and 2. FIG. 1 is a schematic perspective view illustrating an example of the light detecting device according to the present embodiment. FIG. 2 is an exploded perspective view of the example of the light detecting device illustrated in FIG. 1.

The light detecting device 1 detects light that is incident on an avalanche photodiode. The avalanche photodiode is hereinafter referred to as "APD". The description herein is given on a back-illuminated type light detecting device as the light detecting device 1, but the light detecting device 1 may also be a front-illuminated type light detecting device.

The light detecting device 1 is provided with a light-receiving substrate 10, a circuit substrate 20, and a glass substrate 30, as illustrated in FIGS. 1 and 2. The circuit substrate 20 is positioned opposite the light-receiving substrate 10. The glass substrate 30 is positioned opposite the light-receiving substrate 10. The light-receiving substrate 10 is arranged between the circuit substrate 20 and the glass substrate 30. In the present embodiment, a plane parallel to each of the main surfaces of the light-receiving substrate 10, the circuit substrate 20, and the glass substrate 30 is defined as the XY-axis plane, and a direction perpendicular to each of the main surfaces is defined as the Z-axis direction. In the configuration illustrated in FIG. 1 and FIG. 2, the light-receiving substrate 10 and the circuit substrate 20 are arranged in a stacked state in the Z-axis direction.

The light-receiving substrate 10 is, for example, a semiconductor substrate having a rectangular shape in plan view. The light-receiving substrate 10 has main surfaces 1Na and 1Nb that face each other. The main surface 1Na corresponds to the light incident surface of the light-receiving substrate 10.

The light-receiving substrate 10 has at least one pixel U as illustrated in FIG. 2. The light detecting device 1 detects light incident on the pixel U. For example, the light-receiving substrate 10 has a plurality of pixels U. The plurality of pixels U is arranged in a two-dimensional array, such as in a matrix on the light-receiving substrate 10. In the light-receiving substrate 10, a signal is outputted from each pixel U. The light detecting device 1 detects the light incident on each pixel U on the basis of the signal output from each pixel U. The pixels U are arranged in the X-axis and Y-axis directions.

The glass substrate 30 has main surfaces 30*a* and 30*b* that face each other. The glass substrate 30 has a rectangular shape when viewed in plan. The main surface 30*b* faces the main surface 1Na of the light-receiving substrate 10. The main surfaces 30*a* and 30*b* are flat. The glass substrate 30 and the light-receiving substrate 10 are optically connected with an optical adhesive OA. The glass substrate 30 may be formed directly on the light-receiving substrate 10.

The circuit substrate 20 has main surfaces 20*a* and 20*b* that face each other. The circuit substrate 20 has a rectangular shape when viewed in plan. The light-receiving substrate 10 is connected to the circuit substrate 20. The main surface 20*a* faces the main surface 1Nb.

The circuit substrate 20, as illustrated in FIG. 2, has at least one signal processing circuit 21. The signal processing circuit 21 reads out a signal output from the pixel U. The signal processing circuit 21 is electrically connected to the pixel U of the light-receiving substrate 10. The signal processing circuit 21 is electrically connected to the pixel U, for example, through a bump electrode BE. The circuit substrate 20, for example, has a plurality of signal processing circuits 21. For example, the plurality of signal processing circuits 21 is arranged in a two-dimensional array on the side of the main surface 20*a* of the circuit substrate 20. For example, the signal processing circuit 21 and the pixel U are electrically connected in a one-to-one relationship through the bump electrode BE. As a modification of the present embodiment, the signal processing circuit 21 and the pixel U may be electrically connected to each other through a pad electrode provided on each of the light-receiving substrate 10 and the circuit substrate 20, without passing through the bump electrode BE. The term "electrically connected" herein includes the case of being electrically connected through another element.

Figure 3:
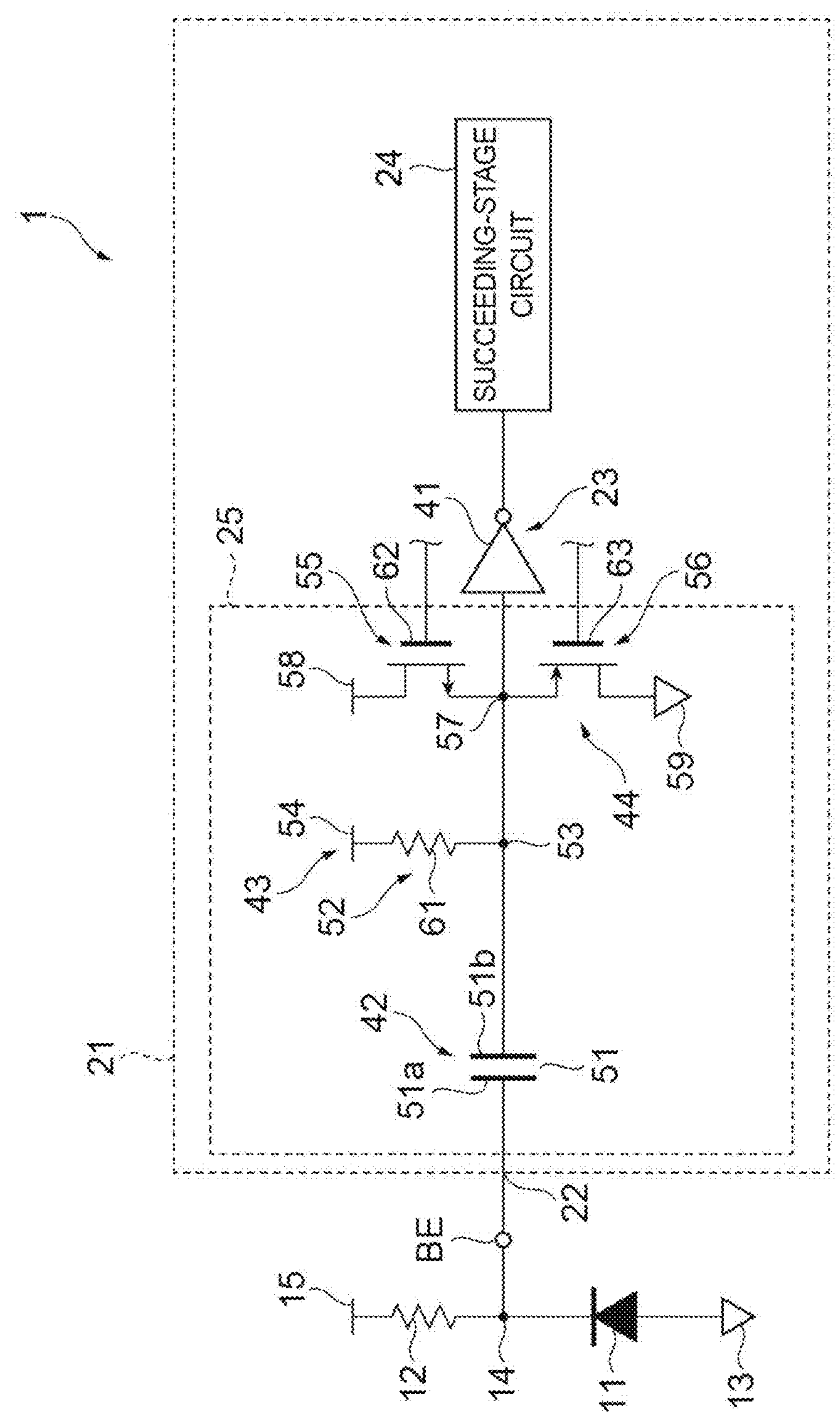
FIG. 3 is a schematic circuit diagram of a portion of the light detecting device.

The circuit configuration of the light detecting device is now described with reference to FIG. 3. FIG. 3 is a schematic circuit diagram of a portion of the light detecting device. The light detecting device 1 is provided with an APD 11, a quenching resistor 12, a bump electrode BE, and a signal processing circuit 21. The light-receiving substrate 10 is provided with an APD 11 and a quenching resistor 12. The pixel U described above is composed of an APD 11 and a quenching resistor 12. Each pixel U is composed of one APD 11 and one quenching resistor 12. For example, the APD 11 and the signal processing circuit 21 are electrically connected to each other in a one-to-one relationship.

The APD 11 is configured to operate in Geiger mode. The APD 11 forms a light-receiving region that detects light for each pixel U. The quenching resistor 12 is electrically connected in series to the APD 11. The quenching resistor 12 is composed of, for example, a passive element. In the configuration illustrated in FIG. 3, the quenching resistor 12 is connected to the cathode of the APD 11. The term "connected" herein does not include a case where the connection is made via an element other than wiring among the elements described herein but does not exclude a case where the connection is made via an element not described herein.

The light detecting device 1 further includes terminals 13, 14, and 15. In the configuration illustrated in FIG. 3, the terminal 13 is connected to the anode of the APD 11. In this configuration, the terminal 14 is connected to the cathode of the APD 11 and to the quenching resistor 12. The terminal 15 is connected to the quenching resistor 12 and is electrically connected to the terminal 14 through the quenching resistor 12. In this configuration, a voltage higher than that of the terminal 13 is applied to the terminal 15. As a result, a reverse bias voltage that causes the APD 11 to break down is applied to the APD 11. For example, the terminal 13 is connected to the ground, and a voltage equal to or higher than the breakdown voltage is applied to the terminal 15. In the present embodiment, the voltage applied to the terminal 15 corresponds to the reverse bias voltage. For example, the voltage applied to the terminal 15 is 40 V or more. For example, the breakdown voltage of the APD 11 is 40 V, the excess bias is 10 V, and the voltage applied to the terminal 15 is 50 V.

The quenching resistor 12 may be connected to the anode of the APD 11 as a modification of the present embodiment. In this case, the terminal 13 is connected to the cathode of the APD 11. In this case, the terminal 14 is connected to the anode of the APD 11 and to the quenching resistor 12. In this configuration, a voltage lower than that of the terminal 13 is applied to the terminal 15. As a result, a reverse bias voltage that causes the APD 11 to break down is applied to the APD 11. In the present modification, for example, the terminal 13 is connected to the ground, and the voltage applied to the terminal 15 is −40 V or less. For example, the breakdown voltage of the APD 11 is 40 V, the excess bias is 10 V, and the voltage applied to the terminal 15 is −50 V.

The signal processing circuit 21 is electrically connected in series with both the APD 11 and the quenching resistor 12. In the configuration illustrated in FIG. 3, the signal processing circuit 21 is electrically connected to the terminal 14 through the bump electrode BE. The signal processing circuit 21 is provided with an input terminal 22, a comparison circuit 23, an adjustment circuit 25, and a control unit 26. In the signal processing circuit 21, for example, the input terminal 22, the comparison circuit 23, and the adjustment circuit 25 constitute a preceding-stage circuit. The signal processing circuit 21 further includes a succeeding-stage circuit 24 that processes the signal output from the preceding-stage circuit.

The input terminal 22 is electrically connected to the corresponding pixel U among the multiple pixels U. The input terminal 22 is linked to the terminal 14, and through the terminal 14, is electrically connected to both the APD 11 and the quenching resistor 12. In the configuration illustrated in FIG. 3, the input terminal 22 is a pad electrode linked to the bump electrode BE. The signal output from the APD 11 is input to the input terminal 22 in response to the incidence of light on the APD 11. The APD 11 outputs an analog signal in response to the incidence of light. The input terminal 22 is input to the analog signal output from the APD 11.

The comparison circuit 23 removes a noise component contained in the signal by comparing information regarding the input signal with a threshold. The comparison circuit 23 compares the information regarding the signal input to the input terminal 22 with the threshold and removes a noise component related to the signal input to the input terminal 22 by the comparison. The comparison circuit 23 outputs a signal based on the component exceeding the threshold among the components contained in the signal input to the comparison circuit 23. The comparison circuit 23 outputs only the component that exceeds the threshold among the components contained in the signal input to the comparison circuit 23. The threshold of the comparison circuit 23 is set to remove component other than those that indicate the incidence of light on the APD 11. For example, the threshold of the comparison circuit 23 is a predetermined value. For example, the threshold of the comparison circuit 23 is a value that is determined during the manufacturing process and is a value that is specific to the comparison circuit 23.

The term "exceeding the threshold" herein includes not only the transition to a value larger than the threshold but also the transition to a value smaller than the threshold. In the configuration illustrated in FIG. 3, the comparison circuit 23 outputs a signal based on the component that undergoes a transition to a value smaller than the threshold among the components contained in the signal input to the comparison circuit 23.

The comparison circuit 23 receives an analog signal based on the signal output from the APD 11 via the input terminal 22. The comparison circuit 23 receives a signal indicating fluctuations in the voltage applied to the terminal 14. The voltage applied to the input of the comparison circuit 23 corresponds to the voltage applied to the terminal 14.

The comparison circuit 23 is configured, for example, to output a digital signal corresponding to the value of the input analog signal. The comparison circuit 23 outputs a digital signal based on the signal output from the APD 11. The digital signal output from the comparison circuit 23 is, for example, a high-low signal indicating the timing at which light is incident on the APD 11.

The comparison circuit 23 includes, for example, an inverter 41. The inverter 41 is a so-called NOT gate. The input of the inverter 41 is a voltage corresponding to the voltage applied to an electrode 51*b* of a capacitor 51, which will be described later. In other words, the input of the inverter 41 is a voltage corresponding to the voltage applied to a terminal 57. The inverter 41 outputs a predetermined voltage in the case where a voltage exceeding a threshold is input. The output of the inverter 41 is, for example, Low in the case where a voltage greater than the threshold is input, and High in the case where a voltage less than the threshold is input. The threshold of the inverter 41 is determined inside the inverter 41. For example, the threshold of the inverter 41 is determined by a circuit element provided inside the inverter 41. The threshold of the inverter 41 is determined by a transistor configured inside the inverter 41. The comparison circuit 23 may be acceptable not to include a comparator with a threshold determined by a voltage applied from outside the comparison circuit 23, and the comparison circuit 23 may be composed solely of the inverter 41. The comparator described above is composed of an analog circuit that includes an amplifier inside, whereas the inverter 41 is composed of an analog circuit that does not include an amplifier. For example, the inverter 41 is composed of a switch circuit that includes a transistor such as a MOSFET. The inverter 41 may also be composed of, for example, a complementary MOS (CMOS).

The succeeding-stage circuit 24 processes the signal output from the comparison circuit 23. The succeeding-stage circuit 24, for example, processes the digital signal output from the comparison circuit 23. The succeeding-stage circuit 24 performs at least one of the following operations: reading out the signal output from the comparison circuit 23, controlling other circuits in the signal processing circuit 21, and detecting the light incident on the APD 11. The succeeding-stage circuit 24 controls other circuits in the signal processing circuit 21 on the basis of, for example, the signal output from the comparison circuit 23. The succeeding-stage circuit 24 detects the light incident on the APD 11 on the basis of, for example, the signal output from the comparison circuit 23. The comparison circuit 23 and the succeeding-stage circuit 24 are configured, for example, by an application specific integrated circuit (ASIC). As a modification of the present embodiment, the comparison circuit 23 and the succeeding-stage circuit 24 may be configured by a field programmable gate array (FPGA).

The adjustment circuit 25 adjusts the signal input to the comparison circuit 23. The adjustment circuit 25 is positioned between the input terminal 22 and the comparison circuit 23. The signal received at the input terminal 22 is fed to the comparison circuit 23 via the adjustment circuit 25. The adjustment circuit 25 includes an AC coupling unit 42, a level shifter unit 43, and a reference value adjustment unit 44.

The AC coupling unit 42 establishes AC coupling between the input terminal 22 and the comparison circuit 23. The AC coupling unit 42 establishes AC coupling between the terminal 14 and the comparison circuit 23. The AC coupling unit 42 establishes AC coupling between the APD 11, the quenching resistor 12, and the comparison circuit 23. The AC coupling unit 42 includes a capacitor 51.

The capacitor 51 includes electrodes 51*a* and 51*b*, which are insulated from each other. The electrode 51*a* is connected to the input terminal 22. The electrode 51*a* is electrically connected to the terminal 14 through the input terminal 22 and the bump electrode BE. The electrode 51*a* is electrically connected to the input of the comparison circuit 23. The capacitor 51 is electrically connected in series to the APD 11 and the quenching resistor 12, and is also electrically connected in series to the inverter 41 of the comparison circuit 23.

The level shifter unit 43 sets the voltage of the signal input to the comparison circuit 23 to a predetermined value. The level shifter unit 43, between the AC coupling unit 42 and the comparison circuit 23, adjusts the voltage of the signal input to the comparison circuit 23 to a value lower than the reverse bias voltage applied to the APD 11. The level shifter unit 43 includes a circuit element 52 and terminals 53 and 54.

The circuit element 52 has a resistance component. In the configuration illustrated in FIG. 3, the circuit element 52 includes a resistance element 61. The resistance element 61 is a passive element. The resistance element 61 includes, for example, a polysilicon resistor. The terminal 53 is connected to both the electrode 51*b* of the capacitor 51 and the resistance element 61. The resistance element 61 is electrically connected in series to the capacitor 51 of the AC coupling unit 42 through the terminal 53. The resistance element 61 is electrically connected in series to the inverter 41 of the comparison circuit 23 through the terminal 53. The terminal 54 is electrically connected to the terminal 53 through the resistance element 61. The terminal 54 is electrically connected to both the electrode 51*a* of the capacitor 51 and the inverter 41 of the comparison circuit 23 through the circuit element 52.

The terminal 54 is applied with a voltage lower than the reverse bias voltage. In the configuration illustrated in FIG. 3, the terminal 54 is applied with a voltage higher than the threshold of the comparison circuit 23. In the case where the output of the comparison circuit 23 is High, the terminal 54 is configured so that the voltage of the output of the comparison circuit 23 is equal to the voltage applied to the terminal 54. The voltage applied to the terminal 54 is, for example, 1.8 V.

The reference value adjustment unit 44 adjusts the reference value of the signal input to the comparison circuit 23. The signal input to the comparison circuit 23 is an analog signal. The "reference value" is the reference value of the amplitude in the analog signal. For example, the reference value is the center value or the lower limit value of the amplitude. The signal input to the comparison circuit 23 fluctuates on the basis of the reference value that is set by the reference value adjustment unit 44. The reference value adjustment unit 44 includes at least one of the circuit elements 55 and 56. In the present embodiment, the reference value adjustment unit 44 includes both the circuit elements 55 and 56. The case where the reference value adjustment unit 44 includes both the circuit elements 55 and 56 is now described. In the present embodiment, the reference value adjustment unit 44 further includes terminals 57, 58, and 59. In the case where the circuit element 55 corresponds to the first circuit element, the circuit element 56 corresponds to the second circuit element. In the case where the terminal 58 corresponds to the first terminal, the terminal 59 corresponds to the second terminal.

The circuit elements 55 and 56 each have a resistance component. At least one of the circuit elements 55 and 56 includes a variable resistance unit configured to be capable of changing the resistance value of the relevant at least one resistance component. The terminal 57 connects the circuit elements 55 and 56 to the comparison circuit 23. The terminal 58 is electrically connected to the input of the comparison circuit 23 through the circuit element 55 and the terminal 57. The terminal 59 is electrically connected to the input of the comparison circuit 23 through the circuit element 56 and the terminal 57. The terminal 58 is applied with a first potential. The terminal 59 is applied with a second potential lower than the first potential. The voltage applied to the terminal 58 is, for example, 1.8 V. The terminal 59 is, for example, connected to the ground.

In one example, at least one of the circuit elements 55 and 56 includes a transistor 62 or a transistor 63, for example, as a variable resistance unit. The circuit element 55 includes the transistor 62, while the circuit element 56 includes the transistor 63. The transistor 62 connects the terminal 58 to the comparison circuit 23. The transistor 63 connects the terminal 59 to the comparison circuit 23. In the present embodiment, the transistors 62 and 63 are field effect transistors (FETs). In the configuration illustrated in FIG. 3, the transistor 62 is an N-channel FET, and the transistor 63 is a P-channel FET.

As a modification of the present embodiment, the transistors 62 and 63 may be bipolar junction transistors (BJTs) or insulated gate bipolar transistors (IGBTs).

In the present embodiment, the transistors 62 and 63 are metal oxide semiconductor FETs (MOSFETs). As a modification of the present embodiment, the transistors 62 and 63 may be junction FETs (JFETs).

Figure 4:
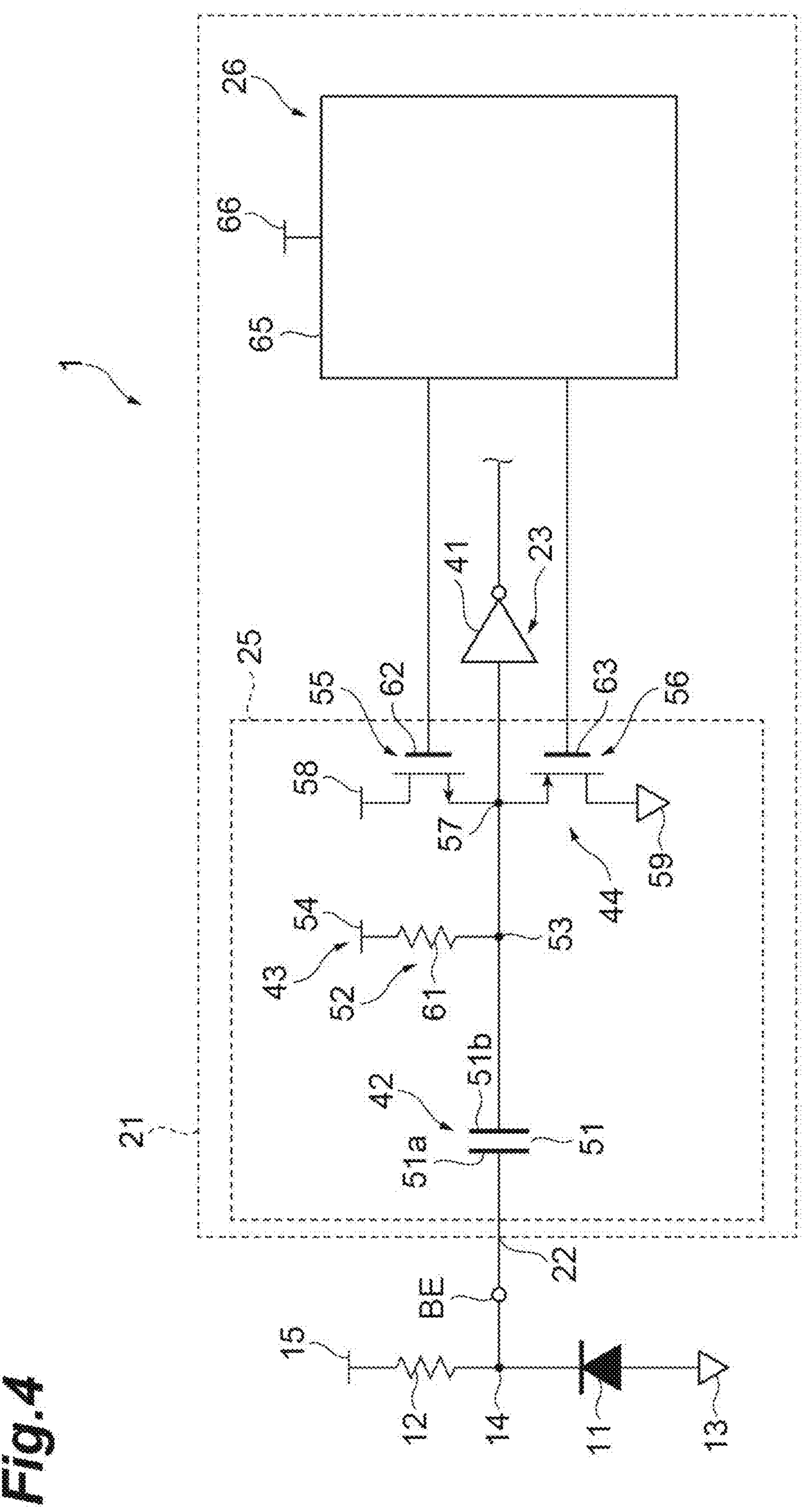
FIG. 4 is a schematic circuit diagram of a portion of the light detecting device.

The control unit 26 controls the reference value adjustment unit 44 to adjust the reference value of the signal input to the comparison circuit 23. As illustrated in FIG. 4, the control unit 26 is electrically connected to the reference value adjustment unit 44 and controls at least one of the circuit elements 55 and 56. In the present embodiment, the light-receiving substrate 10 has a plurality of pixels U, and the control unit 26 controls the reference value of the signal input to the comparison circuit 23 connected to each pixel U. The control unit 26 is, for example, electrically connected to each of the plurality of reference value adjustment units 44 connected to the respective pixels U. The control unit 26 controls, for example, the plurality of reference value adjustment units 44 connected to the respective pixels U simultaneously.

The control unit 26 may be included in the succeeding-stage circuit 24. The control unit 26 is electrically connected to the variable resistance unit of the reference value adjustment unit 44 and controls the resistance value between the terminal 58 or the terminal 59 and the comparison circuit 23. In one example, if the transistors 62 and 63 are FETs or IGBTs, the control unit 26 is electrically connected to the gates of the transistors 62 and 63 of the reference value adjustment unit 44. In one example, if the transistors 62 and 63 are BJTs, the control unit 26 is electrically connected to the bases of the transistors 62 and 63 of the reference value adjustment unit 44. The following description is mainly given on an example in which the transistors 62 and 63 are MOSFETs.

In the configuration illustrated in FIG. 3, the sources of both MOSFETs of the transistors 62 and 63 are linked to the comparison circuit 23. The terminal 57 links the source of the MOSFET of the transistor 62, the source of the MOSFET of the transistor 63, and the input of the comparison circuit 23 to each other. The terminal 58 is linked to the drain of the MOSFET of the transistor 62. The terminal 59 is linked to the drain of the MOSFET of the transistor 63. The control unit 26 controls the voltage applied to the gates of the MOSFETs of the transistors 62 and 63. In one example, if the MOSFET of the transistor 62 corresponds to the first MOSFET, the MOSFET of the transistor 63 corresponds to the second MOSFET.

Figure 5:
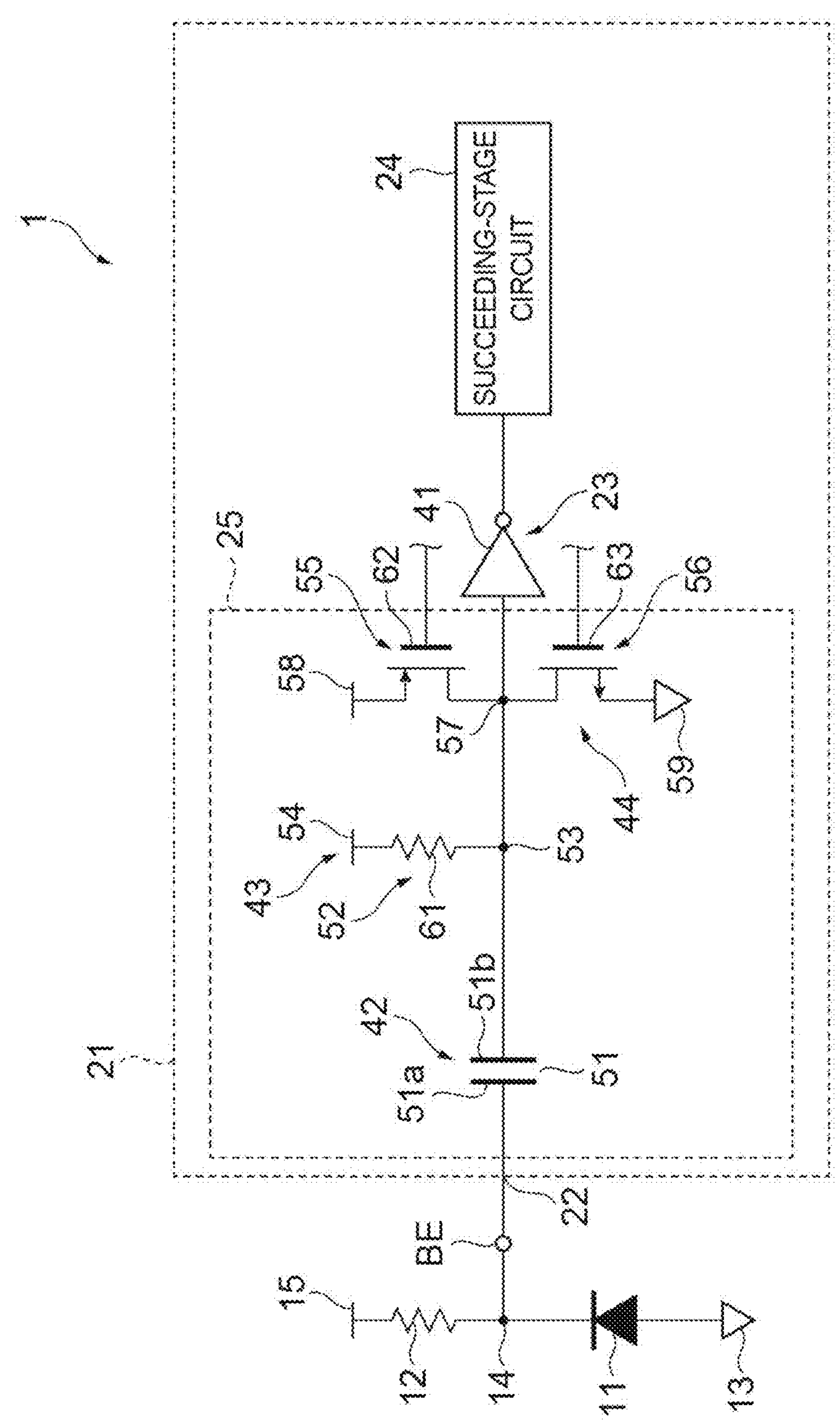
FIG. 5 is a schematic circuit diagram of a portion of a light detecting device in a modification of the present embodiment.

As a modification of the configuration illustrated in FIG. 3, as illustrated in FIG. 5, the transistor 62 may be a P-channel FET and the transistor 63 may be an N-channel FET. In this case, the terminal 57 connects the drain of the MOSFET of the transistor 62, the drain of the MOSFET of the transistor 63, and the input of the comparison circuit 23 to each other. The terminal 58 is linked to the source of the MOSFET of the transistor 62. The terminal 59 is linked to the source of the MOSFET of the transistor 63.

The control unit 26 is, for example, configured by one or more ASICs. As a modification of the present embodiment, the control unit 26 may be configured by an FPGA.

In the configuration illustrated in FIG. 4, the control unit 26 includes a bandgap reference circuit 65 and a terminal 66. The bandgap reference circuit 65 outputs a constant voltage independent of temperature on the basis of the voltage applied to the terminal 66. In the case where the transistors 62 and 63 are FETs or IGBTs, the control unit 26 controls the voltage applied to the gates of the FETs or IGBTs on the basis of the bandgap reference circuit 65. For example, the control unit 26 adjusts the voltage applied to the gates of the FETs or IGBTs of the transistors 62 and 63 to correct the variation in the input to the comparison circuit 23 depending on the change in the environmental temperature, using the output of the bandgap reference circuit 65.

Figure 6:
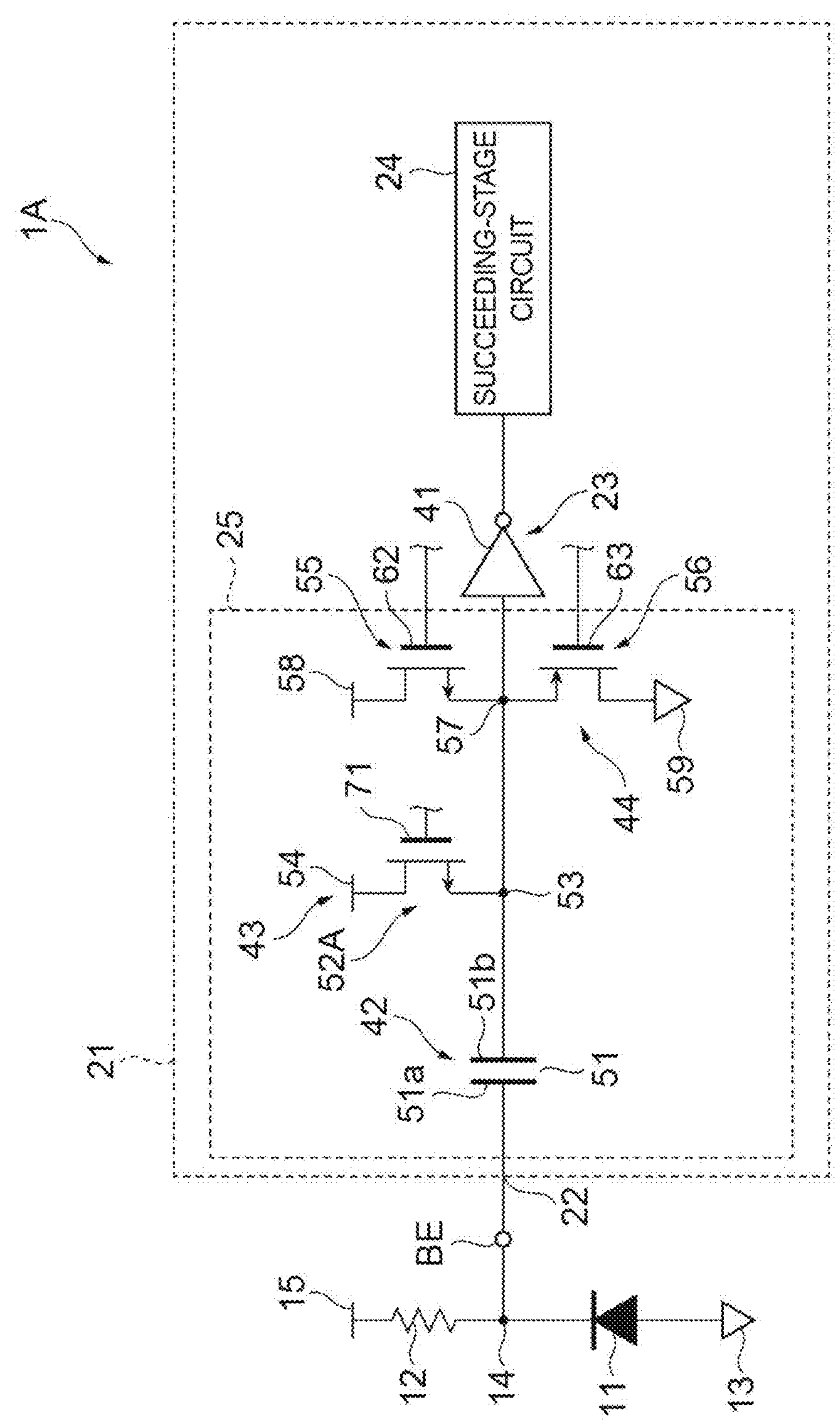
FIG. 6 is a schematic circuit diagram of a portion of the light detecting device in the modification of the present embodiment.
Figure 7:
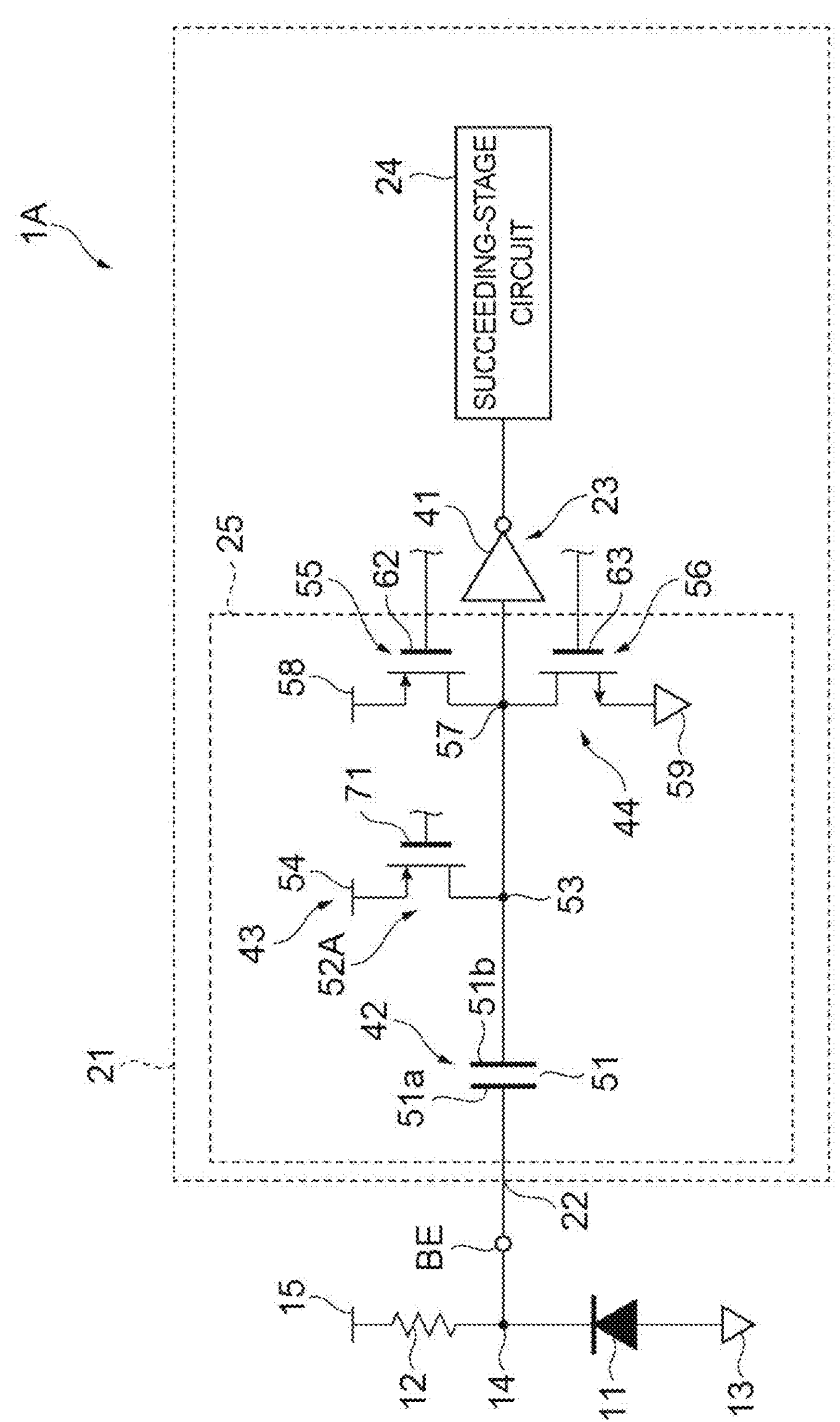
FIG. 7 is a schematic circuit diagram of a portion of the light detecting device in the modification of the present embodiment.
Figure 8:
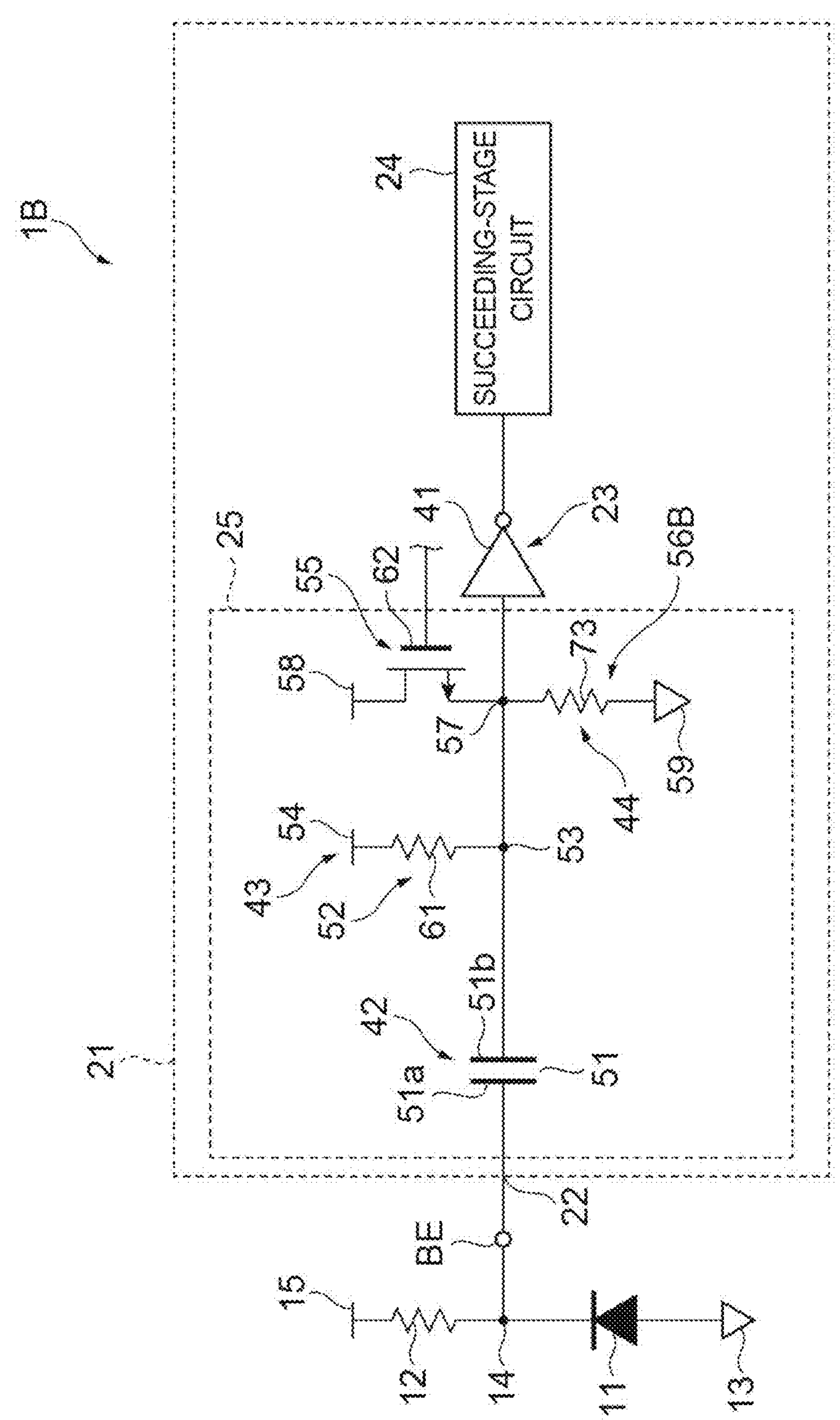
FIG. 8 is a schematic circuit diagram of a portion of the light detecting device in the modification of the present embodiment.

The description is now given on a light detecting device according to modifications of the present embodiment with reference to FIGS. 6 to 8. FIGS. 6 to 8 are schematic circuit diagrams of a part of the light detecting device according to the modifications of the present embodiment. These modifications are generally similar or the same as the embodiment described above.

The differences between the above-described embodiment and the modification illustrated in FIG. 6 are first described. As illustrated in FIG. 6, a light detecting device 1A differs from the light detecting device 1 according to the above-described embodiment in terms of the configuration of the level shifter unit 43. In the light detecting device 1A, the level shifter unit 43 includes a circuit element 52A instead of the circuit element 52. The circuit element 52A of the level shifter unit 43 includes a variable resistance unit, which is capable of changing the resistance value of the resistance component, instead of the resistance element 61. In the present modification, the circuit element 52A includes a transistor 71 as the variable resistance unit.

The transistor 71 is, for example, an FET. In the configuration illustrated in FIG. 6, the transistor 71 is an N-channel FET. The transistor 71 is a MOSFET. As a further modification of the present modification, the transistor 71 may be a BJT or an IGBT. The transistor 71 may be a JFET.

In the present modification, the resistance value of the circuit element 52A is controlled, for example, by the control unit 26. The resistance value of the circuit element 52A may also be controlled by a control unit other than the control unit 26, or it may be manually set in advance. In one example, if the transistor 71 is an FET or an IGBT, the control unit 26 is electrically connected to the gate of the transistor 71 of the reference value adjustment unit 44. In one example, if the transistor 71 is a BJT, the control unit 26 is electrically connected to the bases of the transistors 62 and 63 of the reference value adjustment unit 44. The following description is mainly given on an example in which the transistors 62 and 63 are MOSFETs.

In the configuration illustrated in FIG. 6, the source of the MOSFET of the transistor 71 is linked to the terminal 53. The terminal 53 is connected to the electrode 51*b* of the capacitor 51 and the source of the MOSFET of the transistor 71. The drain of the MOSFET of the transistor 71 is linked to the terminal 54. The control unit 26 is electrically connected to the gate of the MOSFET of the transistor 71 and controls the voltage applied to the gate.

As a further modification of the configuration illustrated in FIG. 6, the transistors 62 and 71 may be P-channel FETs, and the transistor 63 may be an N-channel FET, as illustrated in FIG. 7. In this case, the terminal 57 connects the drain of the MOSFET of the transistor 62, the drain of the MOSFET of the transistor 63, and the input of the comparison circuit 23 to each other. The terminal 58 is linked to the source of the MOSFET of the transistor 62. The terminal 59 is linked to the source of the MOSFET of the transistor 63. The terminal 53 is connected to the electrode 51*b* of the capacitor 51 and the drain of the MOSFET of the transistor 71. The terminal 54 is linked to the source of the MOSFET of the transistor 71.

Figure 9:
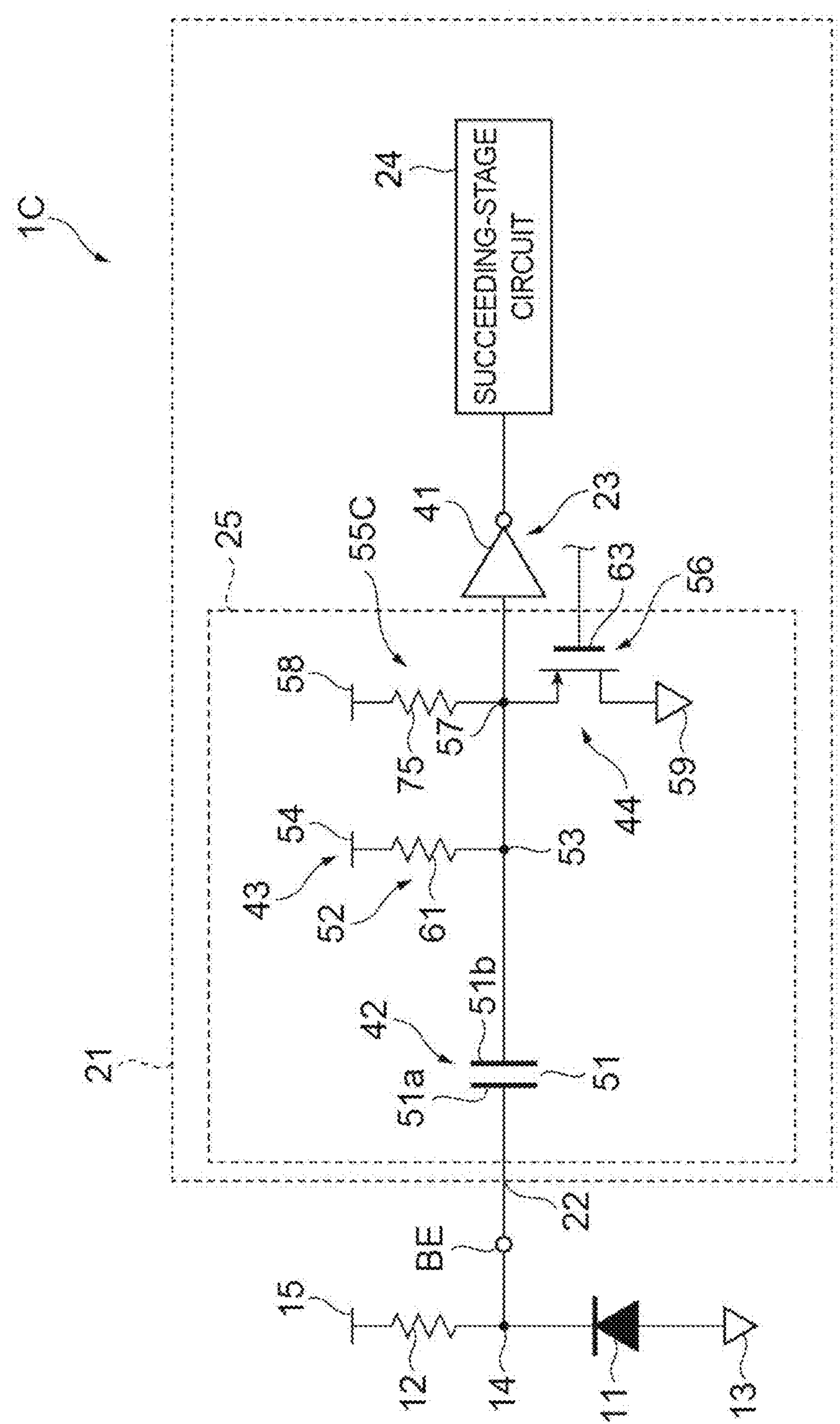
FIG. 9 is a schematic circuit diagram of a portion of the light detecting device in the modification of the present embodiment.

The description is now given on the differences between the above-described embodiment and the modification illustrated in FIG. 8 and FIG. 9. As illustrated in FIG. 8 and FIG. 9, a light detecting device 1B and a light detecting device 1C differ from the light detecting device 1 in the above-described embodiment in terms of the configuration of the reference value adjustment unit 44.

In the light detecting device 1B illustrated in FIG. 8, the reference value adjustment unit 44 includes a circuit element 56B instead of the circuit element 56. The circuit element 56B includes a resistance element 73 instead of the transistor 63. The resistance element 73 is a passive element. The resistance element 73 includes, for example, a polysilicon resistor. The terminal 57 is electrically connected to the terminal 59 through the resistance element 73. In the configuration illustrated in FIG. 8, the transistor 62 is an N-channel FET. In the configuration illustrated in FIG. 8, the transistor 62 may be a P-channel FET.

In the light detecting device 1C illustrated in FIG. 9, the reference value adjustment unit 44 includes a circuit element 55C instead of the circuit element 55. The circuit element 55C includes a resistance element 75 instead of the transistor 62. The resistance element 75 is a passive element. The resistance element 75 includes, for example, a polysilicon resistor. The terminal 58 is electrically connected to the terminal 57 through the resistance element 75. In the configuration illustrated in FIG. 9, the transistor 63 is a P-channel FET. In the configuration illustrated in FIG. 9, the transistor 62 may be an N-channel FET.

Figure 10:
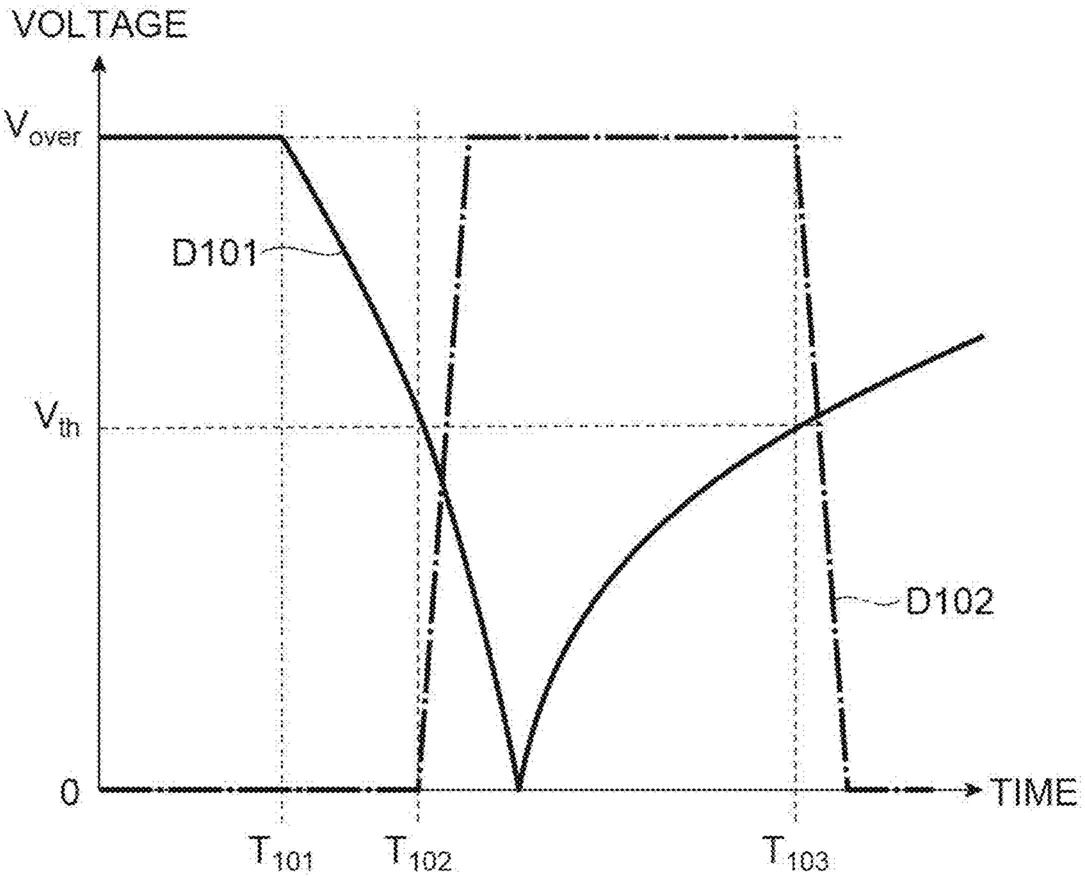
FIG. 10 is a diagram illustrated to describe the conversion of signals in a comparative example.
Figure 11:
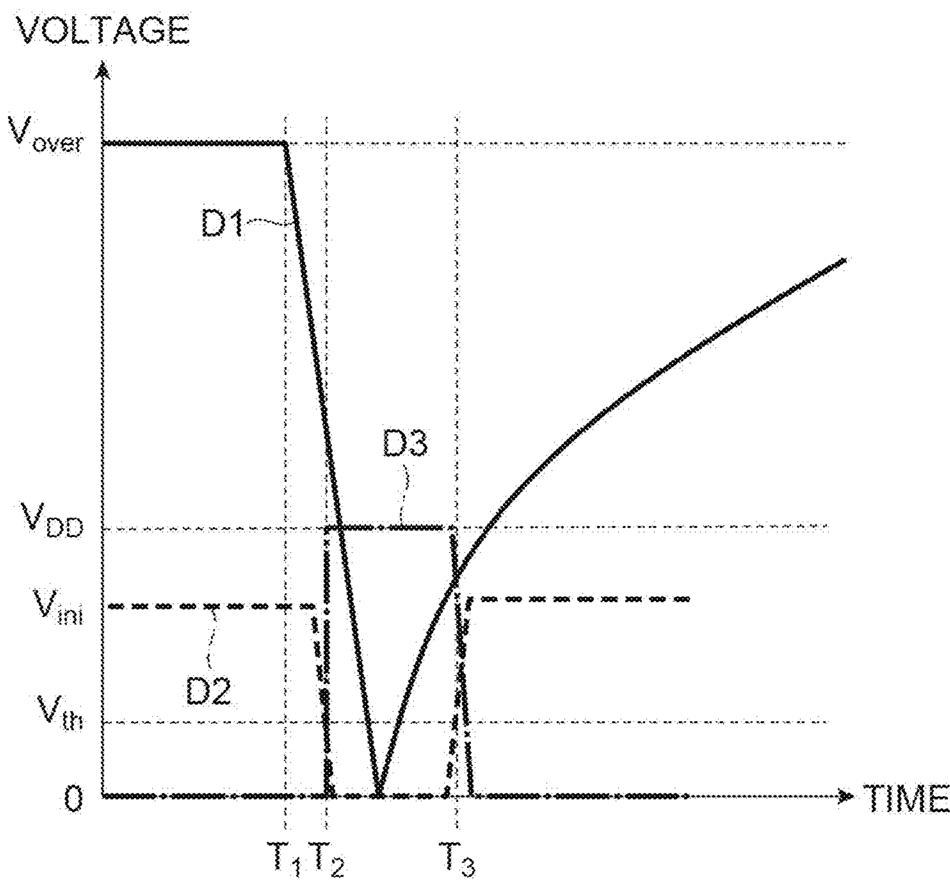
FIG. 11 is a diagram illustrated to describe the conversion of signals in the present embodiment.
Figure 12:
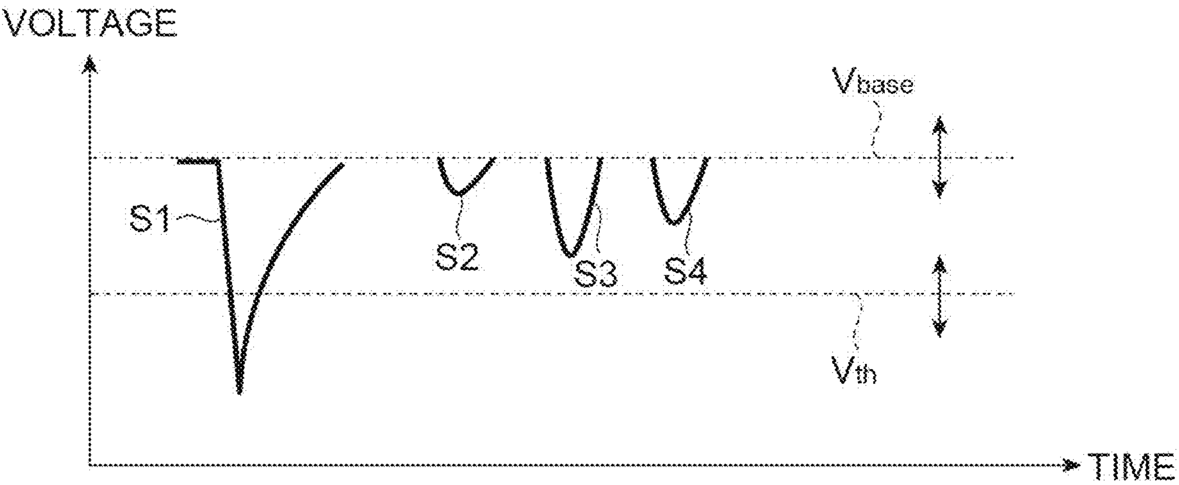
FIG. 12 is a diagram illustrated to describe noise removal.

The description is now given on the effects of the light detecting device 1, 1A, 1B, or 1C and the signal processing circuit 21 with reference to FIGS. 10 to 12. FIG. 10 is a diagram illustrated to describe the conversion of signals in a comparative example. FIG. 11 is a diagram illustrated to describe the conversion of signals in the signal processing circuit 21 of the light detecting device 1. FIG. 12 is a diagram illustrated to describe noise removal in the signal processing circuit 21 of the light detecting device 1.

If light is incident on the APD 11, avalanche multiplication occurs in the APD 11, and a current flows between the terminals 15 and 13 through the APD 11. As a result, a voltage drop occurs in the quenching resistor 12. Thus, the voltage at the input terminal 22 drops from $V_{over}$ in response to the incidence of light on the APD 11. The reverse bias voltage applied to the APD 11 depends on the voltage at the input terminal 22. The voltage $V_{over}$ is the value obtained by subtracting the value of the breakdown voltage of the APD 11 from the value of the reverse bias voltage applied to the APD 11. If the voltage at the input terminal 22 drops to its minimum value, recharging begins. Beginning the recharging also increases the voltage at the input terminal 22.

The comparison circuit 23 outputs a signal based on the component exceeding the threshold among the components contained in the signal input to the comparison circuit 23. The output voltage of comparison circuit 23 rises in the case where the voltage input to the comparison circuit 23 falls below a threshold $V_{th}$, and drops in the case where the voltage input to the comparison circuit 23 exceeds the threshold $V_{th}$.

In FIG. 10, data D101 indicates the voltage at the input terminal 22 in the comparative example, and data D102 indicates the voltage output from comparison circuit 23 in the comparative example. In the comparative example illustrated in FIG. 10, the voltage indicated by the data D101 corresponds to the voltage input to the comparison circuit 23. In FIG. 10, the data D101 begins to drop at time $T_{101}$ in response to light incident on APD 11 and falls below the threshold $V_{th}$ at time $T_{102}$. The data D102 begins to rise at time $T_{102}$ when the data D101 falls below the threshold $V_{th}$ and begins to drop at time $T_{103}$ when the data D101 exceeds the threshold $V_{th}$. The time from when the data D101 begins to drop to when the value of the data D101 falls below the threshold $V_{th}$ is the difference between time $T_{102}$ and time $T_{101}$.

In the comparative example of FIG. 10, the adjustment circuit 25 is removed from the signal processing circuit 21, and the input terminal 22 is electrically connected to the comparison circuit 23 without passing through the adjustment circuit 25. The time required for quenching the APD 11 depends on the product of the resistance value of the quenching resistor 12 and the parasitic capacitance in the signal processing circuit 21. In this comparative example, the time required for quenching is relatively long due to the influence of the parasitic capacitance between the input terminal 22 and the comparison circuit 23. The time required for quenching corresponds to the time required for the voltage at the input terminal 22 to fall in response to the incidence of light on the APD 11. Thus, in the present modification, when light is incident on the APD 11, the voltage at the input terminal 22 drops relatively gradually. For this reason, it takes a relatively long time from when the data D101 starts to drop to when the value of the data D101 falls below the threshold $V_{th}$. Thus, in the present modification, the transmission time from when light is incident on the APD 11 to when the signal indicating the incidence of light on the APD 11 is transmitted to the succeeding-stage circuit 24 is relatively long.

Furthermore, in this comparative example, the voltage output from the comparison circuit 23 rises to an excessive voltage value required for the APD 11 to operate in Geiger mode. For this reason, the succeeding-stage circuit 24 located subsequent to the comparison circuit 23 needs to use a circuit element with a relatively high voltage tolerance. In general, the larger the size of the circuit element, the higher the voltage tolerance of the circuit element. Thus, in this comparison, the size of the succeeding-stage circuit 24 is relatively large.

In the light detecting device 1, 1A, 1B, or 1C, the signal processing circuit 21 includes an adjustment circuit 25 that adjusts the signal input to the comparison circuit 23. The adjustment circuit 25 includes an AC coupling unit 42, level shifter unit 43 or 43A, and a reference value adjustment unit 44, 44B, or 44C. This configuration reduces, in the AC coupling unit 42, the parasitic capacitance between the APD 11 and the comparison circuit 23 and increases the quenching speed. Thus, in the case where light is incident on the APD 11, the voltage at the input terminal 22 drops more sharply than in the comparative example. The level shifter unit 43, between the AC coupling unit 42 and the comparison circuit 23, adjusts the voltage of the signal input to the comparison circuit 23 to a value lower than the reverse bias voltage applied to the APD 11.

In FIG. 11, data D1 indicates the voltage at the input terminal 22 of the light detecting device 1, data D2 indicates the voltage input to the comparison circuit 23 of the light detecting device 1, and data D3 indicates the voltage output from the comparison circuit 23 of the light detecting device 1. In FIG. 11, the data D1 begins to drop at time $T_1$ in response to the incidence of light on the APD 11. The data D2 begins to drop in response to the change in the data D1. The data D2 falls below the threshold $V_{th}$ at time $T_2$. As a result, the data D3 begins to rise at time $T_2$ when the data D2 falls below the threshold $V_{th}$ and begins to drop at time $T_3$ when data the D2 exceeds the threshold $V_{th}$.

The time from when the data D1 begins to drop until the value of data D2 falls below the threshold $V_{th}$ is the difference between time $T_2$ and time $T_1$. The difference between time $T_2$ and time $T_1$ in FIG. 11 is smaller than the difference between time $T_{101}$ and time $T_{102}$ in FIG. 10. Thus, the time from when the data D1 begins to fall until it falls below the threshold $V_{th}$ is shorter than the time from when the data D101 begins to drop until it falls below the threshold $V_{th}$.

Thus, the signal processing circuit 21 of the light detecting device 1, 1A, 1B, or 1C allows the speed of quenching by the AC coupling unit 42 to increase and to reduce the voltage of the signal input to the comparison circuit 23 by the level shifter unit 43, improving significantly the transmission rate of the signal to the succeeding-stage circuit 24.

The AC coupling unit 42 and the level shifter unit 43 or 43A of the light detecting device 1, 1A, 1B, or 1C allows a relatively higher voltage to be ensured on the side of the APD 11 rather than the AC coupling unit 42 and allows a lower voltage to be set on the side of the succeeding-stage circuit 24 rather than the AC coupling unit 42. In FIG. 11, the maximum value of the data D1 is $V_{over}$, and the maximum value of the data D2 is $V_{ini}$, which is lower than $V_{over}$. The maximum value of the output of the comparison circuit 23 is also reduced. In FIG. 11, the maximum value of the data D3 is $V_{DD}$, which is lower than $V_{over}$. As a result, while the photon detection efficiency of the APD 11 is ensured, the succeeding-stage circuit 24 is capable of using a circuit element with a lower voltage tolerance than in the comparative example of FIG. 10. In general, the lower the voltage tolerance of the circuit element, the smaller the size of the circuit element. The smaller the size of the circuit element, the lower the power consumption of the circuit element. Furthermore, the smaller the size of the circuit element, the lower the parasitic capacitance of the circuit element and the faster the signal input/output response speed. Thus, using a circuit element with a relatively low voltage tolerance in the succeeding-stage circuit 24 allows the overall size of the succeeding-stage circuit 24 to be reduced and allows the power consumption of the succeeding-stage circuit 24 to be reduced, improving the speed of the signal input/output response in the succeeding-stage circuit 24.

In FIG. 12, the signal component S1 is a component being input to the comparison circuit 23 in response to the incidence of light on the APD 11, and the signal components S2, S3, and S4 are noise components being input to the comparison circuit 23. The signal components S1, S2, S3, and S4 input to the comparison circuit 23 are components that vary with respect to the reference value $V_{base}$. The comparison circuit 23 outputs a signal based on the components of the signal components S1, S2, S3, and S4 that exceed the threshold $V_{th}$. In the state illustrated in FIG. 12, the signal output from the comparison circuit 23 includes information indicating the input of the signal component S1 but does not include information indicating the input of the signal components S2, S3, and S4. In this case, the succeeding-stage circuit 24 is capable of accurately detecting the incidence of light on the APD 11. On the other hand, if the threshold $V_{th}$ and the reference value $V_{base}$ are set so that the signal components S2, S3, and S4 also exceed the threshold $V_{th}$, the signal output from the comparison circuit 23 also includes a noise component. In this case, the accuracy of the detection of the incidence of light on the APD 11 in the succeeding-stage circuit 24 also decreases.

In the configuration that includes the AC coupling unit 42 and the level shifter unit 43 or 43A, the threshold $V_{th}$ in the comparison circuit 23 may vary. In the configuration that includes the AC coupling unit 42 and the level shifter unit 43 or 43A but not includes the reference value adjustment unit 44, 44B, or 44C, the resistance values of the level shifter unit 43 and the comparison circuit 23 may also vary. The resistance values may vary by approximately 20%. If the resistance values of the level shifter unit 43 and the comparison circuit 23 are different, the reference value $V_{base}$ of the signal input to the comparison circuit 23 will also be different. In the configuration including the AC coupling unit 42 and the level shifter unit 43 or 43A but not including the reference value adjustment unit 44, 44B, or 44C, both the threshold $V_{th}$ in the comparison circuit 23 and the reference value $V_{base}$ of the signal input to the comparison circuit 23 may vary. For this reason, it becomes difficult to remove noise, and maintaining the precision of noise removal is challenging.

The signal processing circuit 21 of the light detecting device 1, 1A, 1B, or 1C includes the reference value adjustment unit 44, 44B, or 44C in addition to the AC coupling unit 42 and the level shifter unit 43 or 43A. The reference value adjustment unit 44, 44B, or 44C adjusts the reference value $V_{base}$ of the signal input to the comparison circuit 23. If the reference value $V_{base}$ of the signal input to the comparison circuit 23 is adjusted according to the variation in the threshold $V_{th}$ of the comparison circuit 23, the precision of noise removal can be ensured. Thus, using the signal processing circuit 21 of the light detecting device 1, 1A, 1B, or 1C allows the transmission rate of the signal to the succeeding-stage circuit 24 to be significantly improved, thus ensuring the precision of noise removal by adjusting the reference value $V_{base}$ according to the threshold of the comparison circuit 23.

The circuit element 52 or 52A of the level shifter unit 43 or 43 is a polysilicon resistor or MOSFET. In this case, the resistance values similar to those of the circuit elements 55 and 56 of the reference value adjustment unit 44, 44B, or 44C can be easily implemented, ensuring the ease of manufacturing of the signal processing circuit 21.

The reference value adjustment unit 44, 44B, or 44C includes the circuit elements 55 and 56 and the terminals 58 and 59. The circuit elements 55 and 56 each have a resistance component. The circuit elements 55 and 56 include a variable resistance unit that is configured to allow the resistance value of the resistance component to be changed. In this case, changing the resistance value in the variable resistance unit enables the reference value of the signal input to the comparison circuit 23 to be easily adjusted.

Furthermore, in the reference value adjustment unit 44, 44B, or 44C, a first potential is applied to the terminal 58. The terminal 58 is electrically connected to the comparison circuit 23 through the circuit element 55. The terminal 59 is applied with a second potential lower than the first potential. The terminal 59 is electrically connected to the comparison circuit 23 through the circuit element 56. At least one of the circuit elements 55 and 56 includes a variable resistance unit configured to be capable of changing the resistance value of the relevant at least one resistance component. In the case where both the circuit elements 55 and 56 are provided, the adjustment range of the reference value of the signal input to the comparison circuit 23 can be improved. In the case where both the circuit elements 55 and 56 include the variable resistance unit, the adjustment range of the reference value of the signal input to the comparison circuit 23 can be further improved.

The control unit 26 is electrically connected to the variable resistance unit of the reference value adjustment unit 44, 44B, or 44C. The control unit 26 controls the resistance value between the terminal 58 or 59 and the comparison circuit 23. In this case, the reference value of the signal input to the comparison circuit 23 can be easily controlled.

At least one of the circuit elements 55 and 56 includes an FET or an IGBT as a variable resistance unit. The control unit 26 includes a bandgap reference circuit 65 and controls the voltage applied to the gate of the FET or IGBT on the basis of the bandgap reference circuit 65. In this case, the bandgap reference circuit 65 is capable of outputting a voltage independent of temperature, so the reference value of the signal input to the comparison circuit 23 can be controlled more accurately. In the case where an FET or an IGBT is used for the circuit element 55 or the circuit element 56, the circuit elements 55 and 56 are controlled by voltage, so external adjustment becomes easier than control by current.

At least one of the circuit elements 55 and 56 includes a MOSFET as a variable resistance unit. The MOSFET connects the terminal 58 or the terminal 59 to the comparison circuit 23. The source of the MOSFET is linked to the comparison circuit 23. In this case, the reference value of the signal input to the comparison circuit 23 can be adjusted more easily. In the case where a MOSFET is used for the circuit element 55 or the circuit element 56, the signal processing circuit 21 is easier to manufacture than the case of using an IGBT or a JFET.

The circuit element 55 includes an N-channel MOSFET. The circuit element 56 includes a P-channel MOSFET. The sources of both the MOSFET of the circuit element 55 and the MOSFET of the circuit element 56 are linked to the comparison circuit 23. In this case, the reference value of the signal input to the comparison circuit 23 can be easily and accurately controlled.

The AC coupling unit 42 includes a capacitor 51. The level shifter unit 43 or 43A includes the circuit element 52 or 52A with a resistance component and a terminal 54 to which a voltage lower than the reverse bias voltage is applied. The terminal 54 of the level shifter unit 43 or 43A is electrically connected to the capacitor 51 and the comparison circuit 23 through the circuit element 52 or 52A of the level shifter unit 43 or 43A. In this case, the voltage of the signal input to the comparison circuit 23 can be easily adjusted to a value lower than the reverse bias voltage applied to the APD 11.

The threshold of the comparator is determined by a voltage applied from outside the comparison circuit 23, while the threshold $V_{th}$ of the inverter 41 is determined internally within the inverter 41. The threshold $V_{th}$ of the inverter 41 varies due to the manufacturing process. The threshold of the comparator is determined by the voltage applied from outside the comparison circuit 23, so even if the resistance values of the comparison circuit 23 and the level shifter unit 43 vary, noise can be removed by adjusting the threshold. Thus, the signal output from the comparator is more accurate than the signal output from the inverter 41. On the other hand, the number of circuit elements constituting the inverter 41 is smaller than the number of circuit elements constituting the comparator, so the signal transmission rate in the inverter 41 is faster than the signal transmission rate in the comparator.

In the light detecting device 1, 1A, 1B, or 1C, the comparison circuit 23 includes the inverter 41. In this case, the transmission rate of the signal to the succeeding-stage circuit 24 can be further improved compared to the case where a comparator with a more complicated structure is used. Furthermore, the light detecting device 1, 1A, 1B, or 1C include the reference value adjustment unit 44, 44B, or 44C. Thus, adjusting the reference value $V_{base}$ by the reference value adjustment unit 44, 44B, or 44C also enables noise caused by the threshold $V_{th}$ of the inverter 41 to be removed.

Figure 13:
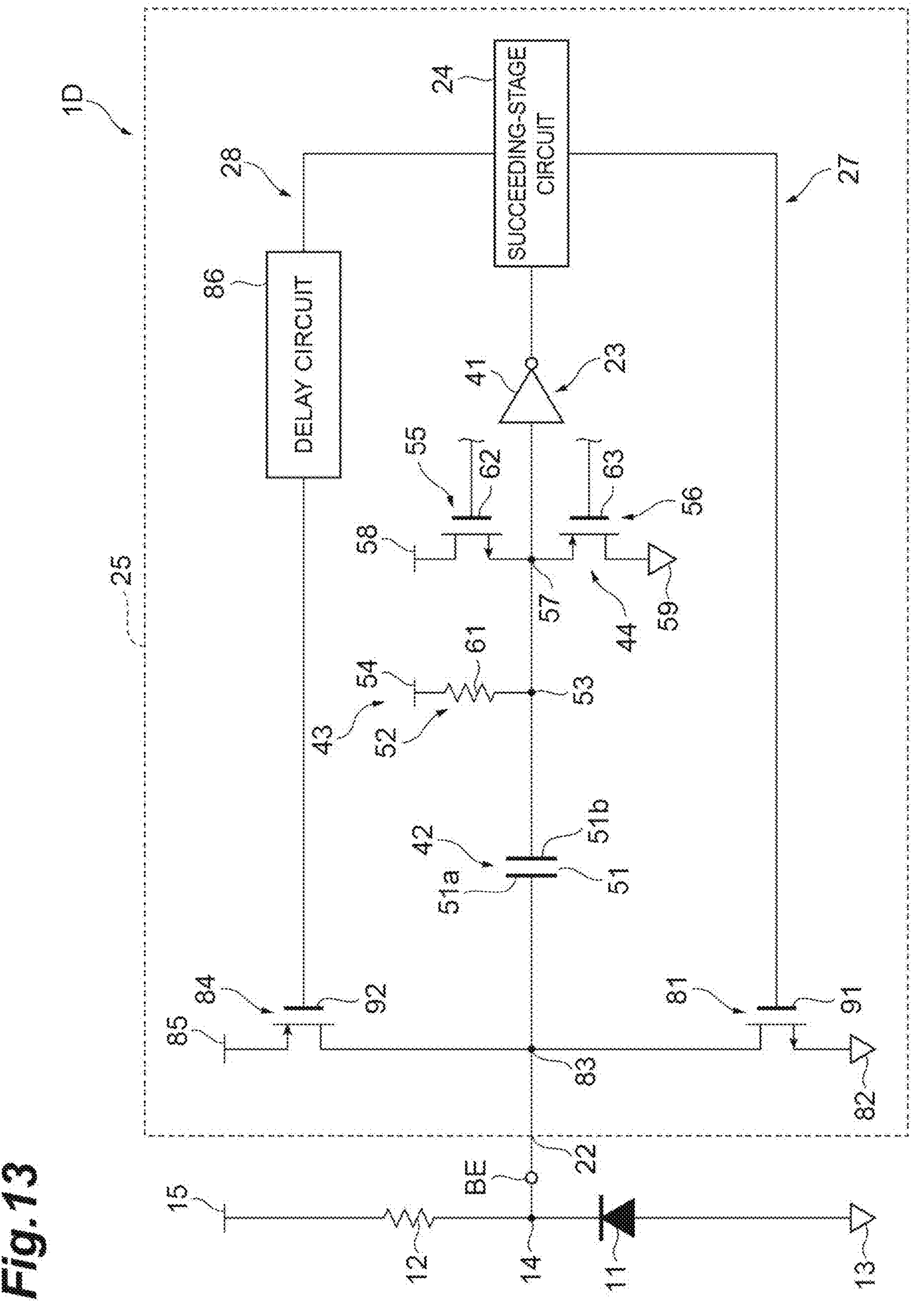
FIG. 13 is a schematic circuit diagram of a portion of a light detecting device in a modification of the present embodiment.

The description is now given on a light detecting device according to a modification of the present embodiment with reference to FIG. 13. FIG. 13 is a schematic circuit diagram of a part of the light detecting device according to the modification of the present embodiment. The present modification is generally similar or identical to the embodiment described above. The light detecting device 1D according to the present modification differs from the light detecting device 1 in the embodiment described above in that the signal processing circuit 21 is configured to perform active recharging and active quenching. The description below is mainly given on the differences between the embodiment and the modification.

The light detecting device 1D further includes at least one of an active quenching circuit 27 and an active recharge circuit 28. In the configuration illustrated in FIG. 13, the light detecting device 1D includes both the active quenching circuit 27 and the active recharge circuit 28. The active quenching circuit 27 and the active recharge circuit 28 are electrically connected to the succeeding-stage circuit 24 and are controlled on the basis of a signal from the succeeding-stage circuit 24. In other words, the succeeding-stage circuit 24 controls at least one of the active quenching circuit 27 and the active recharge circuit 28. The active quenching circuit 27 quenches the APD 11 on the basis of a signal from the succeeding-stage circuit 24. The active recharge circuit 28 recharges the APD 11 on the basis of a signal from the succeeding-stage circuit 24. The active quenching circuit 27 and the active recharge circuit 28 are provided, for example, on the circuit substrate 20.

The active quenching circuit 27 includes a circuit element 81, a terminal 82, and a terminal 83. The circuit element 81 switches the conductive state between the terminal 82 and the terminal 83 on the basis of a signal from the succeeding-stage circuit 24. The terminal 83 is connected to the input terminal 22 and the AC coupling unit 42. The terminal 83 is connected to the input terminal 22 and the electrode 51*a* of the capacitor 51. The input terminal 22 is electrically connected to the electrode 51*a* through the terminal 83.

The circuit element 81 includes a transistor 91. The transistor 91 connects the terminal 82 and the terminal 83. In the present modification, the transistor 91 is an FET. In the configuration illustrated in FIG. 13, the transistor 91 is an N-channel FET. In the present modification, the transistor 91 is a MOSFET. As a further modification of the present modification, the transistor 91 may be a BJT or an IGBT. The transistor 91 may be a JFET. The description is now given mainly on the case where the transistor 91 is a MOSFET.

The source of the MOSFET of the transistor 91 is linked to the terminal 82. The drain of the MOSFET of the transistor 91 is connected to the terminal 83. The gate of the MOSFET of the transistor 91 is electrically connected to the succeeding-stage circuit 24 without passing through a delay circuit 86. The terminal 82 is applied with a voltage lower than the voltage applied to the terminal 15. In one example, a voltage equivalent to the voltage applied to the terminal 13 is applied to the terminal 82. For example, the terminal 82 is connected to the ground.

The active recharge circuit 28 includes a circuit element 84, a terminal 85, a terminal 83, and a delay circuit 86. The circuit element 84 switches the conduction state between the terminal 85 and the terminal 83 on the basis of a signal from the succeeding-stage circuit 24.

The circuit element 84 includes a transistor 92. The transistor 92 connects the terminal 85 and the terminal 83. In the present modification, the transistor 92 is an FET. In the configuration illustrated in FIG. 13, the transistor 92 is a P-channel FET. In the present modification, the transistor 91 is a MOSFET. As a further modification of the present modification, the transistor 92 may be a BJT or an IGBT. The transistor 92 may be a JFET. The description is now mainly given as an example of the transistor 92 being a MOSFET.

The source of the MOSFET of the transistor 92 is linked to the terminal 85. The drain of the MOSFET of the transistor 92 is connected to the terminal 83. The gate of the MOSFET of the transistor 92 is electrically connected to the succeeding-stage circuit 24 through the delay circuit 86. The terminal 85 is applied with a voltage higher than the voltage applied to the terminal 82. The terminal 85 is applied with a voltage higher than voltage applied to the terminal 13. For example, a voltage equivalent to the excess bias is applied to the terminal 85. For example, terminals 13 and 82 are connected to the ground, and a voltage equal to or greater than the breakdown voltage is applied to the terminal 15. For example, the breakdown voltage of the APD 11 is 40 V, and the excess bias is 10 V. For example, the voltage applied to the terminal 15 is 50 V, and the voltage applied to the terminal 85 is 10 V.

The delay circuit 86 is a circuit that delays an input signal by a predetermined time before outputting the delayed signal. The delay circuit 86 is inputted with a signal output from the succeeding-stage circuit 24. The delay circuit 86 delays the time it takes for the signal output from the succeeding-stage circuit 24 to be transmitted to the circuit element 84.

In the configuration illustrated in FIG. 13, the transistor 62 is an N-channel FET, and the transistor 63 is a P-channel FET. As a further modification of the configuration illustrated in FIG. 13, the transistor 62 may be a P-channel FET, and the transistor 63 may be an N-channel FET, as illustrated in FIG. 14. In this case, the terminal 57 connects the drain of the MOSFET of the transistor 62, the drain of the MOSFET of the transistor 63, and the input of the comparison circuit 23 to each other. The terminal 58 is linked to the source of the MOSFET of the transistor 62. The terminal 59 is linked to the source of the MOSFET of the transistor 63.

Figure 15:
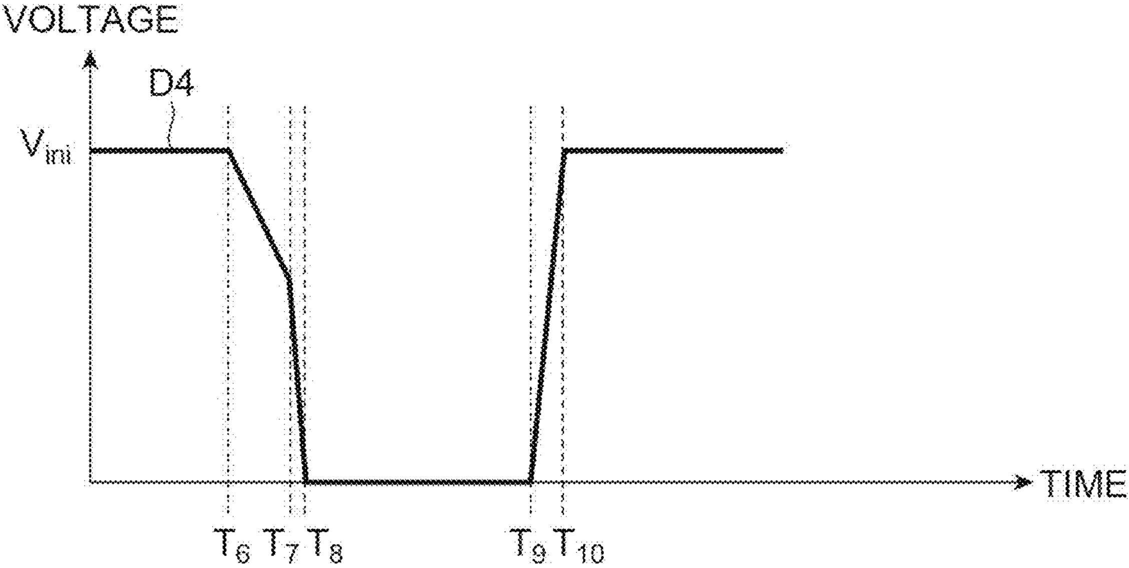
FIG. 15 is a diagram illustrated to describe a signal input to the comparison circuit in the modification.

The effect of the light detecting device 1D and the signal processing circuit 21 of the light detecting device 1D will be described with reference to FIG. 15. FIG. 15 is a diagram illustrated to describe the signal input to the comparison circuit in the present modification. In FIG. 15, data D4 indicates the voltage input to the comparison circuit 23 of the light detecting device 1D. The maximum value of the data D4 is $V_{ini}$, which is similar to the data D2.

The signal processing circuit 21 of the light detecting device 1D further includes at least one of the active quenching circuit 27 and the active recharge circuit 28. As illustrated in FIG. 15, the data D4 indicating the voltage input to the comparison circuit 23 of the light detecting device 1D begins to drop at time $T_6$ due to quenching by the quenching resistor 12. When the signal output from the comparison circuit 23 is input to the succeeding-stage circuit 24, the succeeding-stage circuit 24 outputs a signal to the active quenching circuit 27 and the active recharge circuit 28.

The active quenching circuit 27 performs active quenching on the APD 11 on the basis of the signal from the succeeding-stage circuit 24. For example, in the active quenching circuit 27, a voltage is applied to the gate of the MOSFET of the transistor 91 by the signal output from the succeeding-stage circuit 24. As a result, the resistance between the drain and source of the MOSFET of the transistor 91 decreases, and the voltage of the terminal 83 approaches the voltage of the terminal 82. In this way, active quenching occurs. Due to this active quenching, the data D4 drops more rapidly between time $T_7$ and time $T_8$ than it does between time $T_6$ and time $T_7$ during quenching.

The active recharge circuit 28 performs active recharge on the APD 11 on the basis of the signal from the succeeding-stage circuit 24. The signal input to the active recharge circuit 28 from the succeeding-stage circuit 24 is delayed by the delay circuit 86. Thus, the signal output from the succeeding-stage circuit 24 reaches the transistor 91 of the active quenching circuit 27 and, after a predetermined time has elapsed, reaches the transistor 92 of the active recharge circuit 28 at time $T_9$. For example, in the active recharge circuit 28, the signal output from the succeeding-stage circuit 24 applies a voltage to the gate of the MOSFET of the transistor 92. As a result, the resistance between the drain and source of the MOSFET of the transistor 92 decreases, and the voltage of the terminal 83 approaches the voltage of the terminal 85. In this way, active recharge occurs. Due to this active recharge, the data D4 rises more rapidly between time $T_9$ and time $T_{10}$ than it would if active recharging were not performed. Since the signal processing circuit 21 of the light detecting device 1D includes the AC coupling unit 42, a voltage equivalent to the voltage applied to the terminal 15 can be applied to the terminal 85.

In this way, the synergistic effect of at least one of the active quenching circuit 27 and the active recharge circuit 28, along with the adjustment circuit 25 further shortens the time required for quenching and recharging. Furthermore, while ensuring the photon detection efficiency in the APD 11, it is possible to use a circuit element with a relatively low voltage tolerance in the succeeding-stage circuit 24. Improving the recharge speed can reduce the time during which light is failed to be detected.

Although the embodiments and modifications of the present invention have been described above, the present invention is not necessarily limited to the embodiments described above, and various modifications can be made without departing from the spirit of the present invention.

For example, the configuration of the light detecting device 1 in the above-described embodiment has been described as including the light-receiving substrate 10 and the circuit substrate 20 that face each other in the Z-axis direction. However, the light-receiving substrate 10 and the circuit substrate 20 may be arranged in the XY-axis directions. The light-receiving substrate 10 and the circuit substrate 20 may also be integrally formed.

In the configuration of the light detecting device 1 in the above-described embodiment, the example has been described in which the signal processing circuit 21 and the pixel U are electrically connected to each other through the bump electrode BE. However, the signal processing circuit 21 and the pixel U may be electrically connected to each other without using the bump electrode BE. For example, the signal processing circuit 21 and the pixel U may be electrically connected to each other by bonding pad electrodes. The signal processing circuit 21 and the pixel U may be electrically connected to each other by wire bonding.

In the case where the light-receiving substrate 10 and the circuit substrate 20 are integrally formed, the signal processing circuit 21 and the pixel U may be electrically connected to each other by metal wiring provided in or on the substrate. In this case, the input terminal 22 may be wiring or a connection part of the wiring.

In the above-described embodiment, the case has been described in which the light-receiving substrate 10 has a plurality of pixels U arranged two-dimensionally in a matrix. The light-receiving substrate 10 may have a plurality of pixels U arranged in a row.

In the above embodiment, the case where the light-receiving substrate 10 includes multiple pixels U has been described. The light-receiving substrate 10 may include only one pixel U. The light-receiving substrate 10 may include only one APD 11. In this case, the circuit substrate 20 may include only one signal processing circuit 21.

In the case where the light-receiving substrate 10 has multiple pixels U, the control unit 26 may control the reference value of the signal input to the comparison circuit 23 for each pixel U. In other words, the control unit 26 may control each of the multiple reference value adjustment units 44 connected to the respective pixels U per each of the reference value adjustment units 44. For example, the control unit 26 may generate a control signal for each comparison circuit 23 connected to the pixel U and it may control the reference value adjustment unit 44 corresponding to each comparison circuit 23.

In the case where the light-receiving substrate 10 has multiple pixels U, the control unit 26 may control the reference value of the signal input to the comparison circuit 23 connected to all the respective pixels U included in the light-receiving substrate 10 simultaneously. For example, the control unit 26 may simultaneously control all reference value adjustment units 44 connected to all the pixels U included in the light-receiving substrate 10.

The control unit 26 may control the reference value of the signal input to the comparison circuit 23 connected to the pixels U included in each group for each predetermined group. For example, the control unit 26 may generate a control signal for each group and control multiple reference value adjustment units 44 for each predetermined group. In this case, each group may be composed of multiple pixels U arranged in the same column or row, and multiple adjustment circuits 25 connected to these pixels U, respectively. Each group may also be composed of multiple pixels U adjacent to each other, and multiple adjustment circuits 25 connected to these pixels U, respectively. Each group may be composed of multiple pixels U arranged in a plurality of adjacent columns and multiple adjustment circuits 25 connected to each of these pixels U. Each group may be composed of multiple pixels U arranged in a plurality of adjacent rows and multiple adjustment circuits 25 connected to each of these pixels U. Each group may be composed of multiple pixels U spaced apart from each other and multiple adjustment circuits 25 connected to each of these pixels U.

The control unit 26 and the succeeding-stage circuit 24 may be integrally formed. In this case, the reference value adjustment unit 44 may be controlled on the basis of a signal output from the succeeding-stage circuit 24.

The example in which the glass substrate 30 is provided as the configuration of the light detecting device 1 in the above-described embodiment has been described. However, the light detecting device 1 may be acceptable not to include the glass substrate 30. In this case, for example, the main surface 1Na of the light-receiving substrate 10 is exposed.

The above-mentioned modifications may be combined with each other. For example, the active quenching circuit 27 and the active recharge circuit 28 may be provided in the signal processing circuit 21 of the light detecting device 1A, 1B, or 1C. The level shifter unit 43A of the light detecting device 1A may be provided in the signal processing circuit 21 of the light detecting device 1B or 1C.

REFERENCE SIGNS LIST

1, 1A, 1B, 1C, 1D light detecting device
12 quenching resistor
13, 14, 15, 53, 54, 57, 58, 59, 66, 82, 83, 85 terminal
21 signal processing circuit
22 input terminal
23 comparison circuit
24 succeeding-stage circuit
25 adjustment circuit
26 control unit
27 active quenching circuit
28 active recharge circuit
41 inverter
42 AC coupling unit
43, 43A level shifter unit
44, 44B, 44C reference value adjustment unit
51 capacitor
52, 52A, 55, 55C, 56, 56B, 81, 84 circuit element
65 bandgap reference circuit
$V_{th}$ threshold
$V_{base}$ reference value

The invention claimed is:

1. A signal processing circuit comprising:
an input terminal configured to receive an analog signal output from an avalanche photodiode operating in Geiger mode;
a comparison circuit configured to compare information related to the signal received at the input terminal with a threshold to remove a noise component related to the signal input at the input terminal;
an adjustment circuit configured to adjust a signal input to the comparison circuit; and
a succeeding-stage circuit configured to process a signal output from the comparison circuit,
wherein the comparison circuit outputs a signal based on a component that exceeds the threshold among components included in the signal input to the comparison circuit, and
the adjustment circuit includes,
an AC coupling unit that establishes AC coupling between the input terminal and the comparison circuit,
a level shifter unit that, between the AC coupling unit and the comparison circuit, adjusts a voltage of the signal input to the comparison circuit to a value lower than a reverse bias voltage applied to the avalanche photodiode, and
a reference value adjustment unit that adjusts a reference value of the signal input to the comparison circuit.

2. The signal processing circuit according to claim 1,
wherein the reference value adjustment unit includes a circuit element with a resistance component and a terminal electrically connected to the comparison circuit through the circuit element, and
the circuit element includes a variable resistance unit configured to be capable of changing a resistance value of the resistance component of the relevant circuit element.

3. The signal processing circuit according to claim 2, further comprising: a control unit that is electrically connected to the variable resistance unit and controls a resistance value between the terminal and the comparison circuit.

4. The signal processing circuit according to claim 3, wherein the variable resistance unit includes an FET or an IGBT, and the control unit includes a bandgap reference circuit to control a voltage applied to a gate of the FET or the IGBT based on the bandgap reference circuit.

5. The signal processing circuit according to claim 2, wherein the variable resistance unit includes a MOSFET, the MOSFET connects the terminal to the comparison circuit, and the MOSFET has a source linked to the comparison circuit.

6. The signal processing circuit according to claim 2, wherein the reference value adjustment unit includes first and second circuit elements, each having a resistance component, the terminal includes a first terminal that is applied with a first potential and is electrically connected to the comparison circuit through the first circuit element, and includes a second terminal that is applied with a second potential lower than the first potential and is electrically connected to the comparison circuit through the second circuit element, and at least one of the first circuit element and the second circuit element corresponds to the circuit element and includes the variable resistance unit configured to be capable of changing a resistance value of the resistance component of the at least one of the first and second circuit elements.

7. The signal processing circuit according to claim 6, wherein the first circuit element includes a first MOSFET being an N-channel type as the variable resistance unit, the second circuit element includes a second MOSFET being a P-channel type as the variable resistance unit, and the first MOSFET and the second MOSFET each have a source linked to the comparison circuit.

8. The signal processing circuit according to claim 1, wherein the AC coupling unit includes a capacitor, and the level shifter unit includes a circuit element with a resistance component and also includes a terminal that is applied with a voltage lower than the reverse bias voltage and is electrically connected to both the capacitor and the comparison circuit through the circuit element of the level shifter unit.

9. The signal processing circuit according to claim 1, wherein the comparison circuit includes an inverter.

10. The signal processing circuit according to claim 1, further comprising: at least one of an active quenching circuit that performs active quenching on the avalanche photodiode based on a signal from the succeeding-stage circuit and an active recharge circuit that performs active recharging on the avalanche photodiode based on the signal from the succeeding-stage circuit.

11. A light detecting device comprising:

the signal processing circuit according to claim 1;

the avalanche photodiode; and a quenching resistor that is electrically connected to the avalanche photodiode, wherein the AC coupling unit establishes AC coupling between the avalanche photodiode, the quenching resistor, and the comparison circuit.

* * * * *